(12) United States Patent
Robinson

(10) Patent No.: US 9,195,806 B1
(45) Date of Patent: Nov. 24, 2015

(54) SECURITY SERVER FOR CONFIGURING AND PROGRAMMING SECURE MICROPROCESSORS

(75) Inventor: Craig Robinson, Pleasanton, CA (US)

(73) Assignee: The Boeing Company, Chicago, IL (US)

( * ) Notice: Subject to any disclaimer, the term of this patent is extended or adjusted under 35 U.S.C. 154(b) by 150 days.

(21) Appl. No.: 13/542,493

(22) Filed: Jul. 5, 2012

Related U.S. Application Data

(60) Provisional application No. 61/505,039, filed on Jul. 6, 2011.

(51) Int. Cl.
  *G06F 9/24* (2006.01)
  *G06F 15/177* (2006.01)
  *G06F 12/14* (2006.01)
  *G06F 21/00* (2013.01)

(52) U.S. Cl.
  CPC .............. *G06F 21/00* (2013.01); *G06F 15/177* (2013.01)

(58) Field of Classification Search
  USPC .......................... 713/1, 2, 100, 187, 189, 190; 709/220–222
  See application file for complete search history.

(56) References Cited

U.S. PATENT DOCUMENTS

| | | | | |
|---|---|---|---|---|
| 5,970,142 A * | 10/1999 | Erickson | ....................... | 713/189 |
| 2001/0032318 A1* | 10/2001 | Yip | ......................... | G06F 21/75 713/190 |
| 2003/0005292 A1* | 1/2003 | Matthews et al. | ............. | 713/160 |
| 2005/0100163 A1* | 5/2005 | Buer | .............................. | 380/259 |
| 2005/0114682 A1* | 5/2005 | Zimmer | ................ | G06F 21/572 713/187 |
| 2005/0270840 A1* | 12/2005 | Kudelski | .................. | 365/185.04 |
| 2006/0031685 A1* | 2/2006 | Chen | ..................... | G06F 21/572 713/190 |
| 2007/0150754 A1* | 6/2007 | Pauly et al. | ..................... | 713/193 |
| 2008/0088439 A1* | 4/2008 | Mehaffey | ................. | 340/539.18 |
| 2008/0147831 A1* | 6/2008 | Redjaian et al. | ............. | 709/222 |
| 2009/0083398 A1* | 3/2009 | Ford et al. | ..................... | 709/220 |
| 2009/0094450 A1* | 4/2009 | Krzyzanowski et al. | ..... | 713/100 |
| 2010/0122076 A1* | 5/2010 | Witty | ................................ | 713/2 |
| 2010/0125739 A1* | 5/2010 | Creary et al. | ................. | 713/189 |
| 2011/0289308 A1* | 11/2011 | Sobko et al. | .................. | 713/100 |

OTHER PUBLICATIONS

Embedded Software Assurance for Configuring Secure Hardware, pp. 20-26, J. Ryan Kenny et al, IEEE, 2010.*
CPU Tech Announces the Acalis Sentry Security Server, Business Wire, 2009.*

* cited by examiner

*Primary Examiner* — Shanto M Abedin

(57) ABSTRACT

A security server for programming configuration settings and application images into a target device is disclosed. The security server includes two secure microprocessors. In the security server a first microprocessor is configured to be coupled to a user of the security server and a comparator to validate configuration data as it progresses through the security server. The first microprocessor receives configuration data and application data for use in configuring the target microprocessor. A second secure microprocessor is coupled to the first secure microprocessor through a high-speed communications link. This second microprocessor provides a security engine for encryption of data and a verifier for verifying that the configuration settings and application images are correctly stored in the target microprocessor.

8 Claims, 17 Drawing Sheets

SECURITY SERVER FOR CONFIGURING AND PROGRAMMING SECURE MICROPROCESSORS

REFERENCE TO RELATED APPLICATION

This application claims priority from U.S. Provisional Patent Application Ser. No. 61/505,039, filed Jul. 6, 2011, and entitled "Secure Server for Configuring and Programming Secure Microprocessors and Infinite Key Memory Transaction Unit," the contents of which are incorporated by reference herein.

BACKGROUND OF THE INVENTION

This invention relates to computer security, security of programmable devices such as microprocessors, and to tools that configure such programmable devices so they operate securely. In particular, the invention relates to a security server which can be used by a security engineer to configure secure microprocessors for use in applications where classified information, or other proprietary valuable information, is to be protected.

In the prior art secure microprocessor were programmed using conventional personal computers or other, generally non-secure, devices. Access to the device provided access to the entire target microprocessor configuration unless traditional, cumbersome file-level privileges were employed. The desired configuration information and application information for the secure microprocessor was collected on the personal computer, encrypted if desired, and then provided to the microprocessor as a boot image. Because the personal computer or other device was not itself secure, companies or individuals programming the secure microprocessors had to rely upon the proverbial "guards, guns, and gates" as security for their operations. Unfortunately this creates a gaping hole in security, in the sense that for any operations which must be done in the field, providing such security is nearly impossible.

SUMMARY OF THE INVENTION

The invention provides a security server that allows a security engineer to define the data, physical security settings, and application information for a secure microprocessor, often referred to herein as the 'target' microprocessor. The server manages the process of defining the desired secure microprocessor configuration, encrypting and securing that configuration information and encrypting and securing any application executable code that the secure microprocessor may execute, or data it may access. The system allows configuration of on-chip security features of the secure microprocessor, including, but not limited to firewalls, event responses, key management policies, and tamper penalties.

The security server itself includes a pair of microprocessors. A first microprocessor is configured to be coupled to a user of the security server. That microprocessor receives configuration data and application data for use in configuring the target microprocessor. It also provides a comparator feature to assure that the data programmed into the secure microprocessor is as intended. A second microprocessor is coupled to the first microprocessor through a communications link over which encrypted communications are transmitted. This second microprocessor is coupled to a flash memory for storing data to configure the target microprocessor with the configuration settings and the application image. A verification portion of the second microprocessor compares the configuration settings and application images intended to be programmed into the target microprocessor, with those actually programmed into the target microprocessor to assure appropriate configuration data and application images. In a preferred embodiment the target microprocessor and each of the microprocessors in the security server are each secure microprocessors, e.g. as manufactured by the assignee.

In one embodiment, a method of securely configuring a target microprocessor includes the steps of providing to an interface operating on the first microprocessor a configuration message which includes the configuration data for configuring the target microprocessor. Then the configuration data is encrypted and transmitted to the second microprocessor. The second microprocessor is coupled to the target device and the configuration data is stored in a decrypted form in the target device. Application images for the target microprocessor are handled in the same manner as the configuration data. Of course other types of processors, for example conventional microprocessors, programmable logic devices or similar devices may be used in place of the target microprocessor, as well as the processors within the security server.

DETAILED DESCRIPTION OF THE PREFERRED EMBODIMENTS

Figure 1:
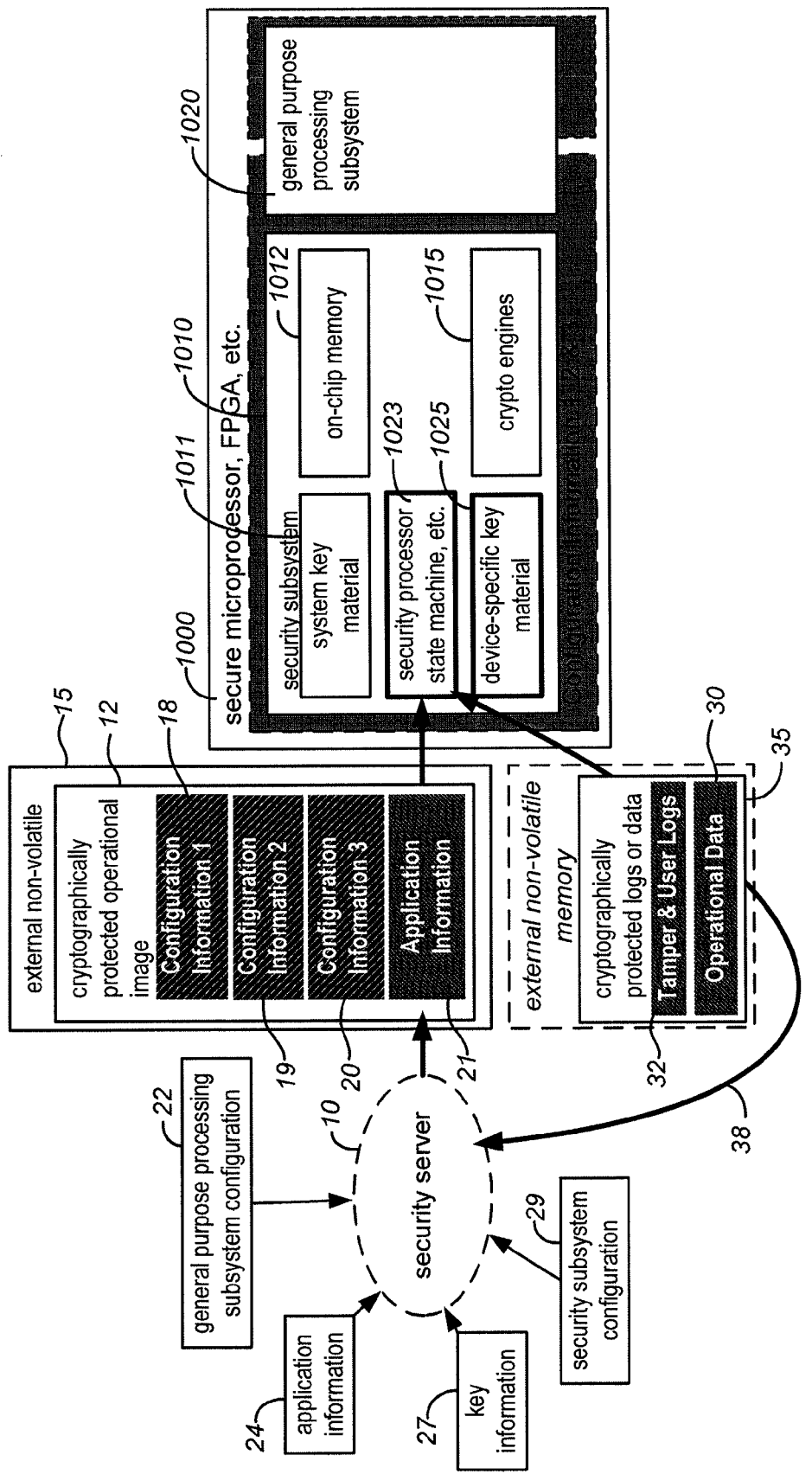
FIG. 1 illustrates use of the security server in preparing a boot image for programming of a secure microprocessor, and for processing logs and operational data generated by the secure microprocessor.

CPU Technology (the assignee) has developed a secure microprocessor, known as the Acalis® Secure Processor, to provide security protection for software and systems. The largest value in many computing systems and microprocessor-based systems today is in the software and data: algorithms, rules and data that the owner desires to protect. This is particularly true for systems handling proprietary software and data, such as financial or health related information, and it is especially true for systems handling classified data, such as military information. Threats to system integrity begin with reverse engineering attacks on software and the data the secure microprocessor can access. As a consequence, systems often become vulnerable to cloning, malicious insertion of code and countermeasures. While a secure microprocessor protects software and data in the field, our security server provides the protections required to create, manage and generate the configuration of the secure microprocessor, as well as any applications to be executed by, data used by, or operational data generated by the secure microprocessor. Herein we use the terms secure microprocessor, secure processor, and target device or processor interchangeably, in the context of the particular features or operations being described.

The defenses of the secure microprocessor start with its design and manufacture to minimize the risk of unwanted hardware insertions. Further, on power up, the secure microprocessor is securely booted from an encrypted flash memory file created using our security server. The security server employs encryption technology to protect the flash image and manages customer-selectable security configuration options. While all security configuration options can be set at power up, some can optionally be managed at runtime by a trusted software application.

During runtime, the secure microprocessor monitors a large number of 'events' that may be indicative of attempts to compromise the owner's software or data, for example, an attempted access of a restricted address space. Such access can come from malware injected into a software image by an adversary. Events are assigned to different response sequences based on the criticality of the event, and the desired device or system-level effect. In response to an event, the secure microprocessor can provide a log of tamper incidents back to the security server for further analysis. The security server is the tool used by a security engineer to define the desired response sequences from the individual responses supported by the secure microprocessor, create the event response associations in a table used operationally by the secure microprocessor, and review encrypted security logs created by the secure microprocessor.

Once running, an application on the secure microprocessor relies upon firewalls, each with a set of configuration options as defined by the security server, to ensure that malicious or errant code is not allowed to improperly use the various components in the secure microprocessor. The security server manages multiple configurations for each type of firewall. Additionally, the security server supports the ability to set policies that are enforced by a trusted application running on the secure microprocessor. Of particular importance here is that security configurations for the secure microprocessor are created and managed using a security server to configure the secure microprocessor and protect the software algorithms from access. This document describes that server.

FIG. 1 illustrates the overall functionality provided by the security server 10. There are generally two types of individuals who interact with the security server 10. We refer to them as 'security engineers' and 'software developers.' Security engineers configure the security server 10 so that it can be used by the various software engineers associated with a particular application. Configuration information includes items such as the keys required to encrypt images, the parameters used to obfuscate the security configuration, customization of algorithms run by the secure microprocessor, additional special purpose algorithms to be run by the secure microprocessor, and any application-specific security feature configuration options. Once the security server has been configured by a security engineer for a specific application, it can be placed on a network or in a secure location. Software engineers can then establish connections with the security server. Once a connection has been established and verified, the software engineer can request the security server perform a subset of the flows and functions supported by the security server, for example, submit unencrypted software binaries for encryption.

The security server is 'provisioned' before it is used to configure a particular instance of a secure (or target) microprocessor to be used in a customer application. Provisioning is the process by which a security server is programmed with customer-specific and project-specific information, after which it is allowed to perform normal operations. During the provisioning process, the security engineer also specifies which security server functions and data require multi-factor authentication such as a USB security token to be present to perform, access or update. The provisioning process is performed by the customer after receiving the security server (typically from the assignee herein).

Uploading a license file provided to the customer triggers the provisioning process of the security server. Once provisioned, the security server can be used to create, save, and restore target device configurations. A target device configuration is a superset of a security configuration and includes application configuration information. Application configurations, any upload content, boot image code, flash content, etc. are used to create a boot image, i.e. a binary object consisting of code and/or data that has a specific purpose in configuring the secure microprocessor. The boot image is created by the security server based on the configuration and application information provided to it. A specially designated sub-component of the boot image is code that is executed by the microprocessor core(s), e.g. PowerPC cores. This sub-component represents an application that boots upon power up or after triggering of an event significant enough to change the operation of the device. For example, if a tamper event occurs, this sub-component can be loaded to force the secure microprocessor to enter a mode where information is purged and/or 'phones home' that something improper occurred.

Information from the target device configuration, created by the security engineer, is used to create boot images, field update images, key collections, etc. In addition the security server also provides for updating its licenses, upgrading its firmware, protecting customer applications and data, collecting and creating key material, as well as independently erasing and sanitizing its firmware and customer configuration information.

To better understand the security server, we first discuss the overall operation of the security server in conjunction with a secure microprocessor being configured by the security server. FIG. 1 illustrates use of the security server 10 to program the secure microprocessor 1000 by providing a cryptographically protected operational image 12 which is stored in an external non-volatile memory, e.g. a flash memory 15. The cryptographically protected operational image 12 typically will contain three types of configuration information 18, 19 and 20 as well as application information 21. Each of these types of information is discussed below. The system allows configuration firewalls, event response sequences, defense mechanisms for use in the event of tampering, etc.

On the right-hand side of the diagram of FIG. 1 is illustrated the secure microprocessor or target device 1000 to be programmed by the security server 10. The target device commonly takes the form of a microprocessor, however, it may also consist of a field programmable gate array, or some other programmable device. The programmable device 1000 typically includes at least two major components—a security subsystem 1010 and a general purpose processing subsystem 1020. The general purpose processing subsystem 1020 is a conventional programmable device, which may include configurable registers or other programmable aspects. The security system 1010 typically includes a number of components. It typically will include storage for system key material 1011, on-chip memory 1012, and cryptographic engines 1015 used to encrypt and decrypt information passing to and from the secure microprocessor 1000. Importantly, the secure microprocessor 1000 usually will have a security processor (or state machine) 1023, as well as 'permanent' device-specific key material 1025.

The cryptographically protected operational image 12 provided by the security server 10 usually will contain the configuration and application information needed to configure the security subsystem and the general purpose processing subsystem. This information enables the secure microprocessor to operate in its desired modes while executing the specified application software. In particular, the secure microprocessor 1000 as used in conjunction with the security server 10 of our system employs various techniques and algorithms to protect critical program information within it from attack. Of particular importance here is prevention of such attacks when the microprocessor is most vulnerable, namely during device configuration and software loading ("boot up"). In a preferred embodiment the secure microprocessor 1000 is an Acalis® CPU872 microprocessor, commercially available from the assignee herein.

As shown in FIG. 1, broadly characterized, the security server 10 receives four primary types of information which it uses in creating the protected operational image for programming the secure microprocessor 1000. These four types of information are general purpose processing subsystem configuration information 22, application information 24, key information 27 and security subsystem configuration information 29. The security server 10 accepts these types of information, as well as other information described below, and uses that information to create the cryptographically protected operational image 12 which is used to program the microprocessor 1000. Once the boot image is loaded into the secure microprocessor 1000, the processor functionality will be defined, security features established, and application information provided. We use the term "application" to refer to either software code developed by a customer of the security server for a particular project being implemented by the user of the secure microprocessor or programmable logic configuration information developed by a customer of the security server for a particular project being implemented by the user of a programmable logic device. The former applications are typically developed using tools and software distributed with the security server, while the latter applications are developed using tools and software distributed by the programmable logic vendor.

An additional feature of the system is that the security server 10 can also receive cryptographically protected information from the secure microprocessor 1000. This information 30 consists of cryptographically protected logs and/or operational data. The logs 32 include tamper and user logs 32, discussed in more detail below. The operational data 35 can consist of any type of data which is desired to be communicated from the secure microprocessor 1000 back to the security server 10. There are multiple methods for communicating the logs and data to and from the security server and the security subsystem of the microprocessor. The bidirectional arrow 38 designates that this information can flow back and forth between the server 10 and the microprocessor 1000.

Circuits within the secure microprocessor 1000 monitor its operating environment and its functions and interfaces. Depending on the user-defined configuration of the 'event mask register,' events will be captured by the secure microprocessor. Then, based on their criticality, events can be associated with programmable response sequences, for example, a software 'interrupt', a memory 'flush', a 'permanently disable' the secure microprocessor.

When an event occurs, information about the event is stored within a detection circuit in the secure microprocessor 1000. If the event is configured to trigger a software interrupt, the trusted software application can then query the detection circuit and respond accordingly. Severe threats can be programmed to cause an immediate hardware response, such as a complete flush of all sensitive volatile storage on the device. If deemed appropriate by the security engineer when defining the secure microprocessor's security configuration, the system can be rebooted once the threat is identified, and then the threat eliminated or countered. A more drastic hardware measure is to 'permanently disable' the secure microprocessor, rendering it completely inoperable.

The security server described herein can use both symmetric-key algorithms and asymmetric-key algorithms. Symmetric-key algorithms are algorithms for cryptography that use the same cryptographic keys for both encryption of plaintext and decryption of ciphertext. The keys may be identical or there may be a transformation to go between keys. In effect the keys represent a shared secret between the sender and the receiver that enables a private communication link. The requirement that both parties have access to the secret key is a drawback of symmetric key encryption.

Asymmetric cryptography (or public-key cryptography) is a form of cryptography in which the key used to encrypt a message differs from the key used to decrypt it. In asymmetric-key algorithms each user has a pair of cryptographic keys—a public key and a private key. The private key is kept secret, while the public key is distributed and used by others to send messages to the recipient. Incoming messages are decrypted with the corresponding private key. The keys are related mathematically, but the user's private key cannot be derived from the public key. The security server allows the security engineer to specify which algorithms are used when generating the various subcomponents of the operational image, logs, operational data, operational keys, etc.

Preferably, the security server 10 and secure microprocessor 1000 employ a standard public/private key algorithm such as Elliptic Curve Diffie-Hellman (ECDH) and a standard symmetric-key algorithm such as Advanced Encryption Standard (AES). The AES standard includes three block ciphers, AES-128, AES-192 and AES-256, adopted from a larger collection. Each of these ciphers has a 128-bit block size, with key sizes of 128, 192 and 256 bits, respectively. Programming of each secure microprocessor is done with a customer-proprietary 'Customization Value' and optionally a customer-proprietary 'Activation Value' which allow configuration, update, software, key, data, logs and other images to be effectively 'locked' so they can only be used with/on devices programmed by known entities, e.g. owners of the secure microprocessor 1000. Additionally, devices programmed with either a Customization Value or Activation Value reject software images that have not been properly encrypted. Software images can be further locked to individual devices using a device's unique key material when available.

Among aspects of the secure microprocessor which can be programmed are registers that define event masking Typically these registers can be configured at power up, as well as at runtime. The usual customer will choose a mix of these two methods to define the security protocol for the system. Typical events that can be detected by the secure microprocessor include: unauthorized JTAG, GPIO or other interface activity; unacceptable temperature rates of change; manipulation of the system clock, single event upsets, and memory 'out of bounds' activity. On-chip hardware firewalls on the secure microprocessor separate it from the mesh router and separate all external interfaces to on-chip blocks. Each firewall is configurable and allows for custom security configurations. The security configuration contains the specified security settings for a secure microprocessor, e.g. firewall, encryption level, etc. settings.

Each of the subsystems within the secure microprocessor 1000 integrate hardware encryption/decryption/secure hash algorithms engines. These engines optionally can be used to encrypt, decrypt or hash data written from the processor subsystem or data read into the processor subsystem. DMA sources and destinations include any (non-restricted) memory mapped location in the processor's global address space. This address space is not limited to internal components and subsystem, but includes external interfaces as well.

Figure 2:
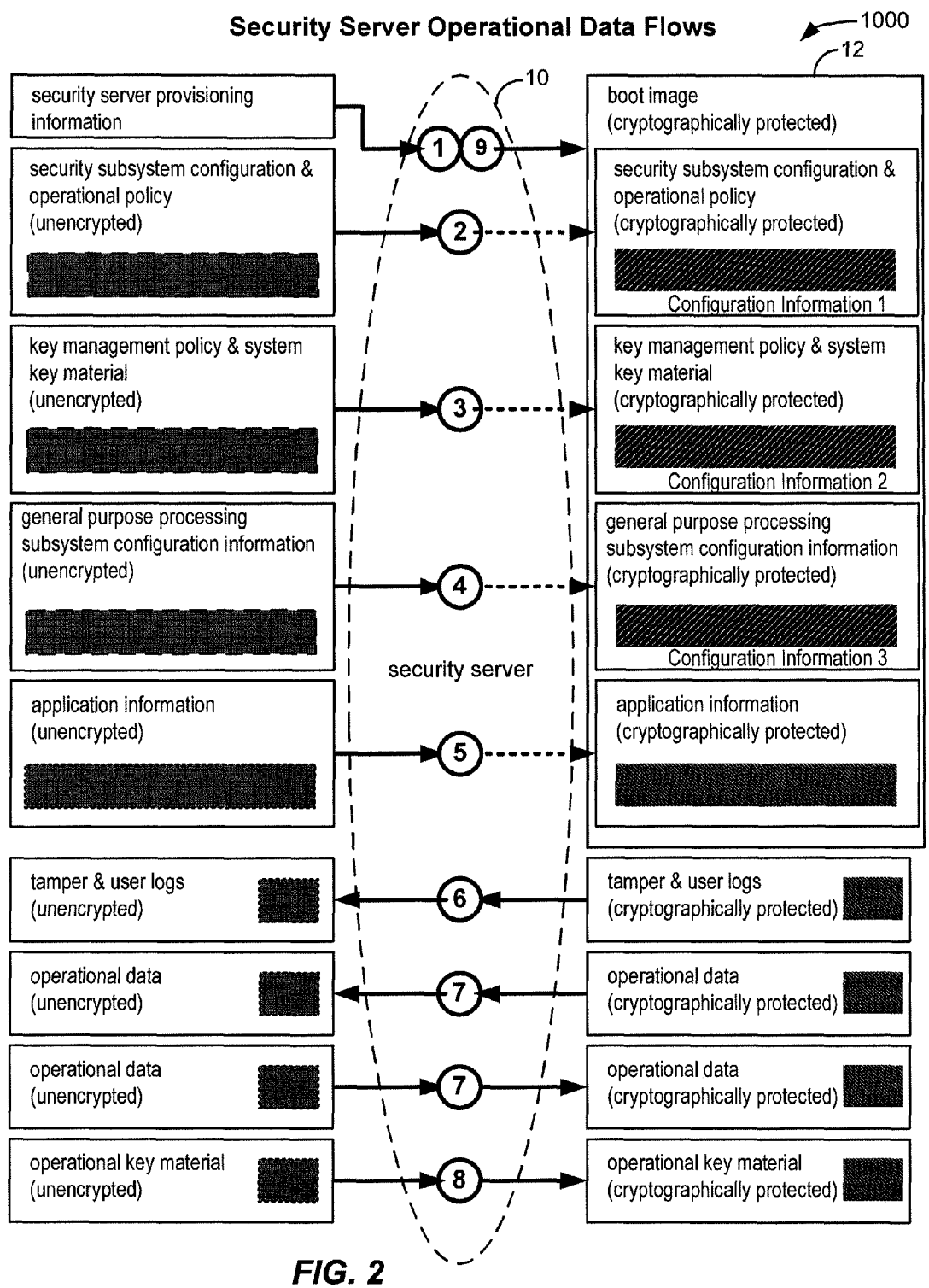
FIG. 2 illustrates the operational data flows for the security server.

The main data flows 1 through 9 involving the security server 10 are shown in FIG. 2. These data flows are labeled 1-9 and each is discussed in more detail below. Note that data flow 1 only provisions the security server 10, and data flow 9 is a combination of several flows relying on the complete set of data needed to exercise those flows to create a complete boot image 12 for the target device, typically a secure microprocessor 1000. The data flows 2 through 5, and 8, transmitted from the security server side 10 to the secure microprocessor side 1000 are: security subsystem configuration and operational policy 2, key management policy and system key material 3, general purpose processing subsystem configuration information 4, application information 5, and operational key material 8. Data flow 9 is a combination of data flows 2-5 used to create a boot image 12. Data flowing in the opposite direction, that is, primarily from the microprocessor 1000 to the server 10, includes tamper logs and user logs 6. Operational data 7 flows bi-directionally between the security server and the microprocessor.

As shown in FIG. 2 information provided to the security server by the security engineer of types 1-5, is unencrypted, but when loaded into the secure microprocessor, it is delivered in either an unencrypted or encrypted form depending on the desired configuration. Information proprietary to the secure microprocessor itself is always encrypted while information proprietary to the customer is either encrypted or unencrypted depending on the customer's phase of development. For example a security engineer might start development with unencrypted software binaries but transition to encrypted software binaries as the customer approaches production. Operational data 7 from the microprocessor 1000 almost always arrives at the server 10 in a cryptographically protected form, and the server 10 then decrypts that data before providing it to the security engineer or other authorized user of the security server.

Figure 3:
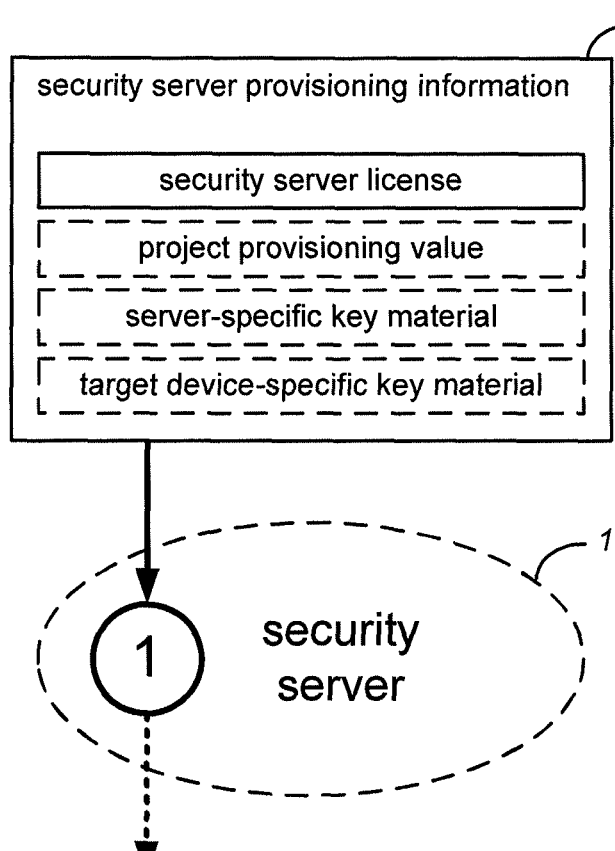
FIG. 3 illustrates provisioning of the security server with license information, key material, and other information.

FIG. 3 illustrates the provisioning step 1 of the security server 10 with the necessary information 33. This information includes the security server license, an application program provisioning value, server specific key material, and target device specific key material. As indicated in the figure, this information will be used by the security server in providing operational data flows 2 through 9.

The data flow 1 of provisioning information 33 is shown in more detail in FIG. 3. That operation includes programming by the manufacturer of an application specific license and shipment of the security server to the customer. When the customer receives the server, the security engineer programs application specific provisioning values, specifies server specific key material, and specifies target device specific key material. This input data typically consists of a security server license associated with that particular customer and an application provisioning value associated with a customer's particular project. This enables the customer to control access to the security server on a project by project basis. The values that are used by both the security server and the security subsystem on the secure microprocessor depend on the desired configuration and policies the customer implements. While the server only contains a single license, the server is capable of managing multiple applications. The security server manages multiple sets of target device specific key material for each application, and all of the information is cryptographically protected and stored within non-volatile storage contained within the security server.

With regard to initial provisioning of the security server, upon login, the system administrator must change his/her default password and then download security server specific information which is sent to the assignee. The assignee then generates a customer-specific license enabling those features the customer has purchased and sends the license to the customer. Upon receipt of the license, the administrator then logs back into the security server, and uploads the license information to activate the security server. An initial configuration of the server is then performed enabling the server to now accept application information and security information.

After this is completed, the security server can be used to prepare the configuration information for the secure microprocessor. As will be described in more detail below, the information provided to the microprocessor includes configuration information for a security system within the microprocessor, key management configuration information, the general purpose processing subsystem configuration information, and application software.

Figure 4:
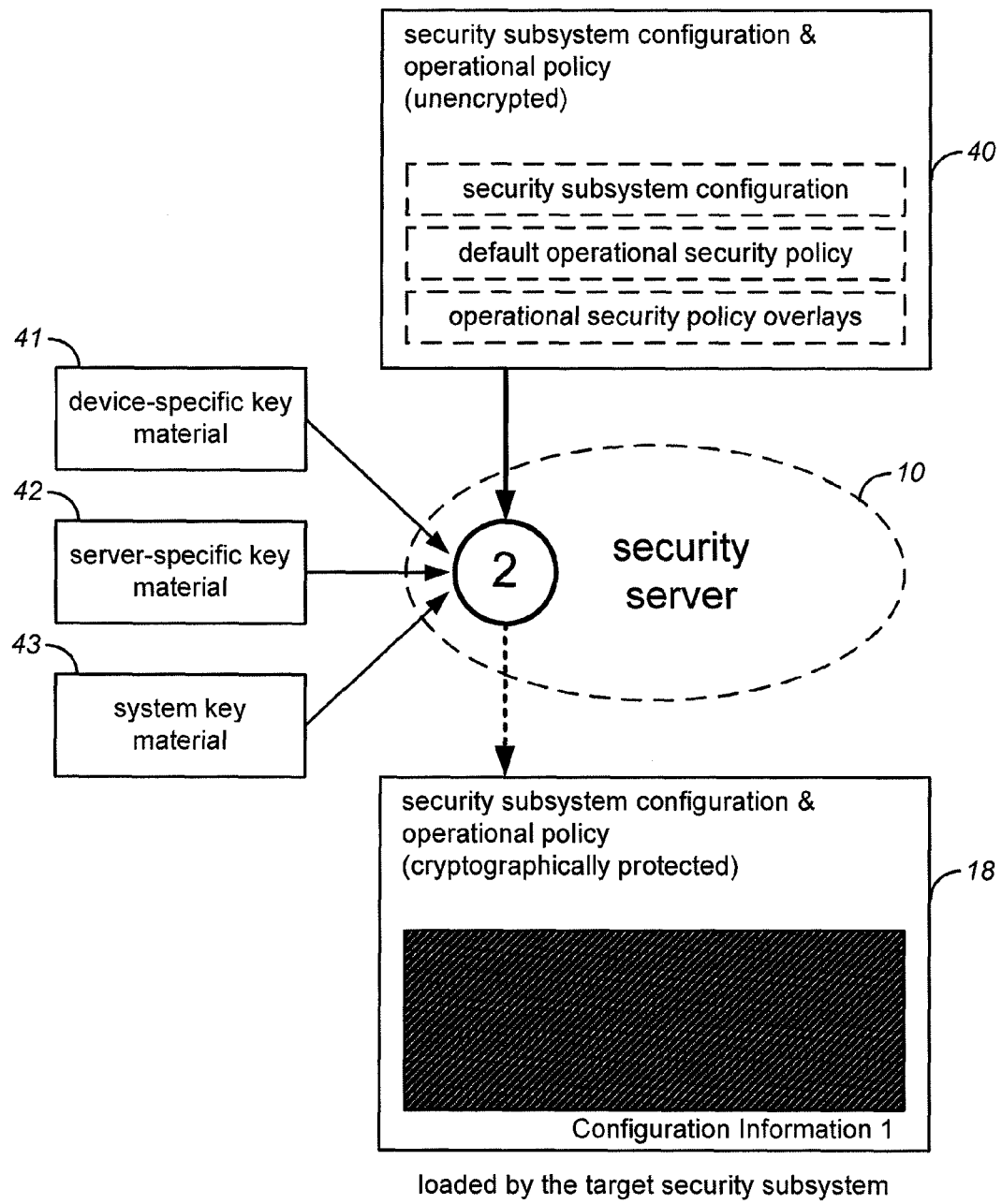
FIG. 4 illustrates the generation of security policy configuration information by the security server.
Figure 5:
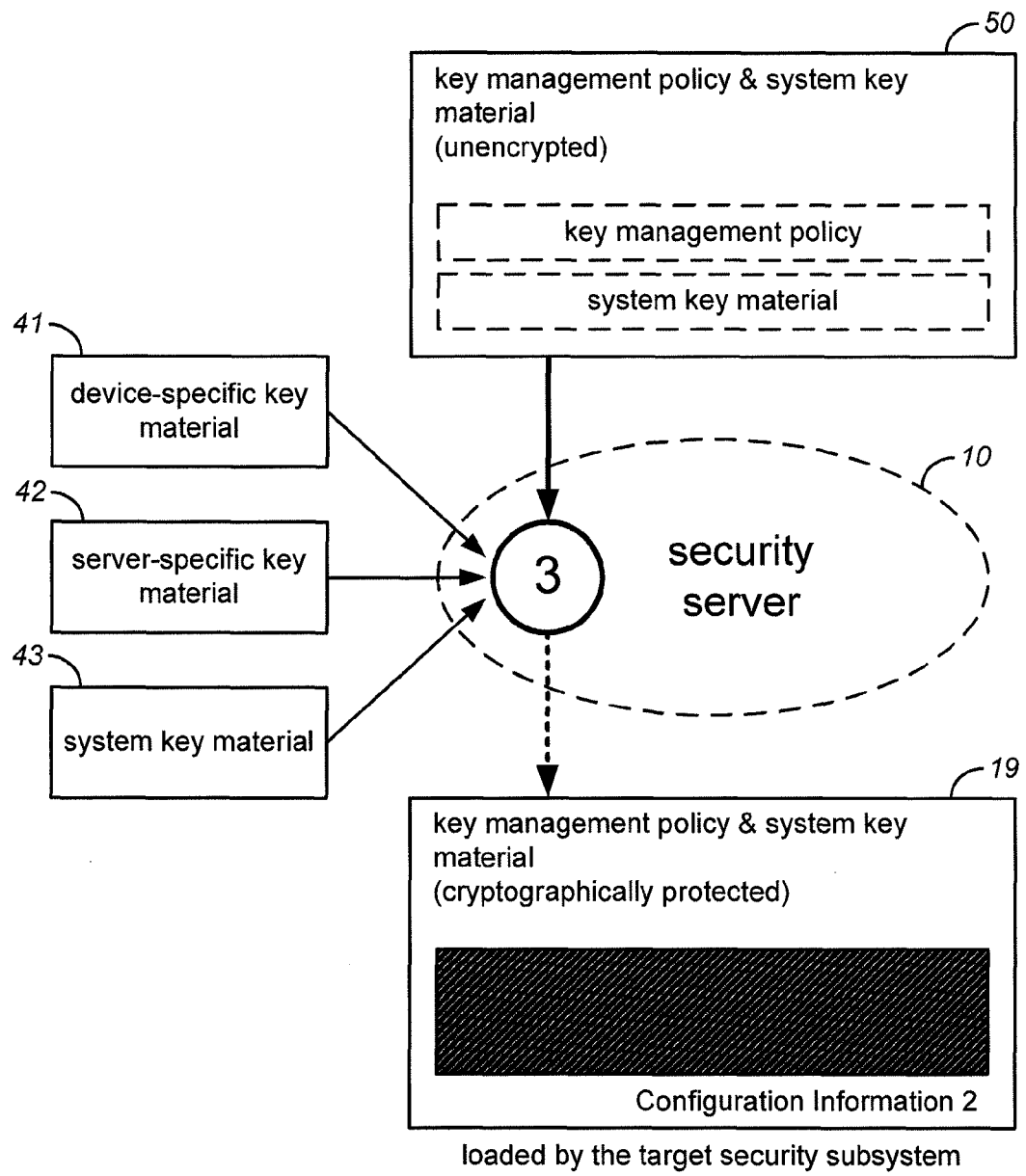
FIG. 5 illustrates the generation of system key configuration information by the security server.
Figure 6:
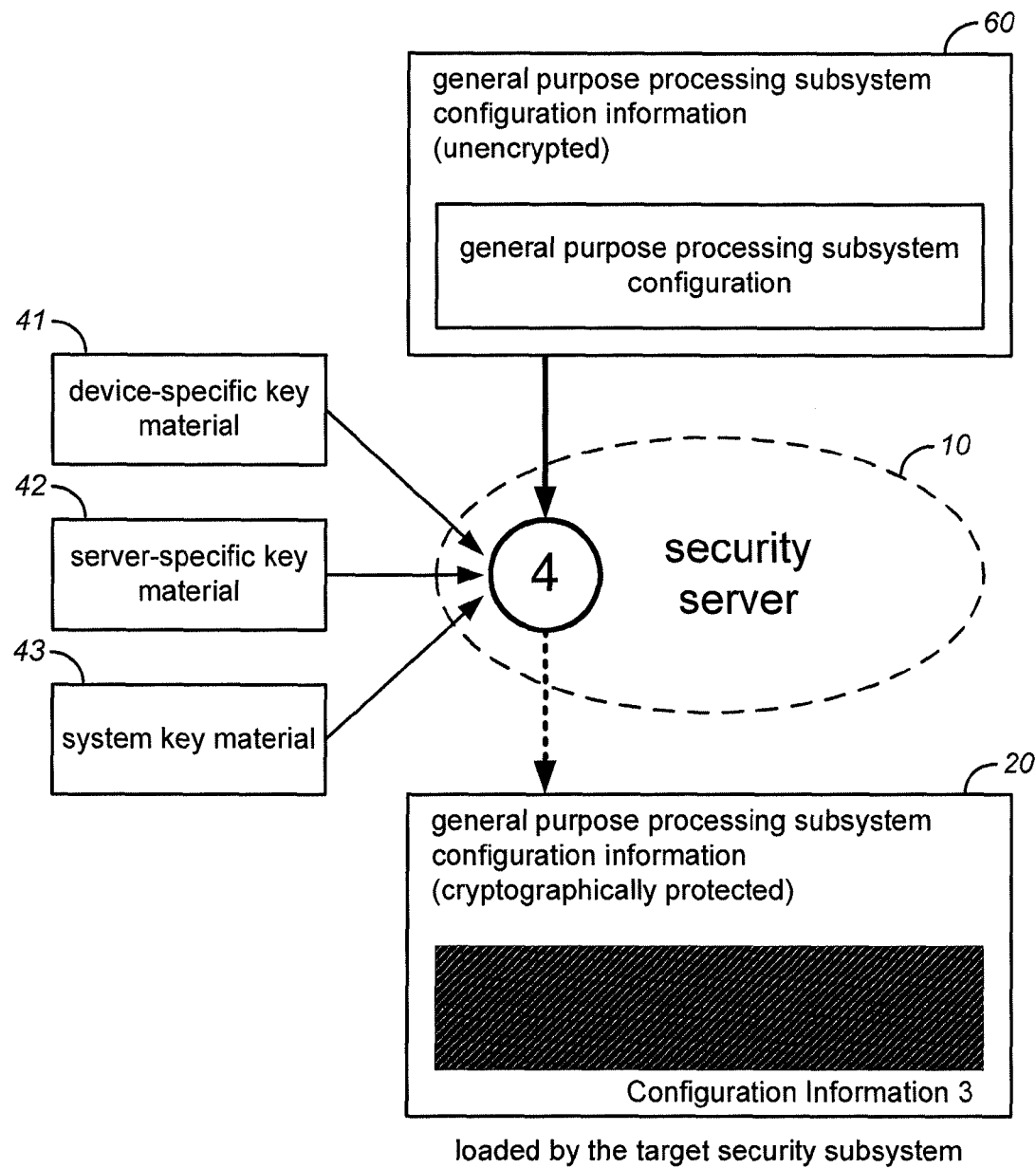
FIG. 6 illustrates the generation of general device configuration information by the security server.

FIGS. 4, 5 and 6 are diagrams illustrating the generation of configuration information of types 2, 3 and 4 initially shown in FIG. 2 which are used in the boot image 12. FIG. 4 illustrates the generation of security subsystem configuration information by the security server 10. This figure illustrates the generation of the security system configuration and operational policies. As shown in the diagram, the security server 10 receives information 40 which includes the security subsystem configuration information, a default operational security policy, and operational security policy overlays. When generating the configuration information that will be loaded by the secure microprocessor, it uses the device specific key material 41, server specific key material 42, and system key material 43 entered into the security server during provisioning. All of this information is appropriately processed to provide the cryptographically protected security subsystem configuration and operational policy information 18.

To implement this process, the security engineer for the application being managed by the security server 10 configures various security aspects for the security subsystems of the target microprocessor which are to be loaded by the security subsystems at power up of the target device. The security engineer also enters the operational security policy for the target device, and may optionally generate a configuration image for use to update the security subsystem of target devices already in the field. The input data typically consists of the images required to load any processors within the target security subsystem, and the configuration information for the various engines contained within the security subsystem of the target devices. In addition, the input data will also include a default operational security policy for the target device, as well as specific security policy overlays for each application that is to be loaded into the target. This information will further define the limits of application interactions with the target security subsystem beyond has been set by the default policy.

The cryptographic protection for the information will typically consist of device specific material for the security subsystem configuration and default operational security policy, as well as system key material. In addition, if necessary, the cryptographic protection will also include server specific material. The operational security policy applies not only to the security subsystem components, but also to how the general purpose subsystem components are permitted to interact with the security subsystem. Although the default security policy is applied to the entire target device and loaded to the security subsystem of the target device, the overall policy takes into account updating the default policy as new applications are loaded into the system.

FIG. 5 illustrates data flow 3, in this case information 19 about encryption keys and use of the cryptographic engine(s) implemented within the target device. As shown in FIG. 5, the key management policy and system key material 50 in an unencrypted form are provided to the security server 10. Server 10 receives this input information and generates the configuration information using key material 41, 42 and 43 discussed above.

To implement this process, the security engineer for the application being managed by the security server 10 configures various key management policies supported by the security subsystem of the target device. The security engineer also enters key material into the various tiers of the system key material information. In addition the engineer may generate a configuration image for use to update a target device already in the field. The input data will include the desired key management policy used by the security subsystem during both the boot process and during regular operation. It also includes the tiered system key material which is loaded by that subsystem during its booting process, and which may be used during operation. As described above, the information is all cryptographically protected with device specific key material and provided as configuration information 19.

FIG. 6 illustrates the remaining aspects of the generation of configuration information for the target device, in this case data flow 4 from FIG. 2—configuration of the general purpose processing subsystem on the target device. To implement this step, as before, the security engineer configures the general purpose processing subsystem components as necessary for the application. The input data consists of the that data required to configure the general purpose subsystems, while the key material used to generate the configuration information is the same key material as earlier described, key material 41, 42 and 43.

The general purpose processing subsystem can have various types of configurable functionality, for example microprocessor cores, bridges, switches, fuses, programmable logic, memory, etc. While it will typically be configured only at power up, it is also possible to dynamically reconfigure aspects of that subsystem later.

Figure 7:
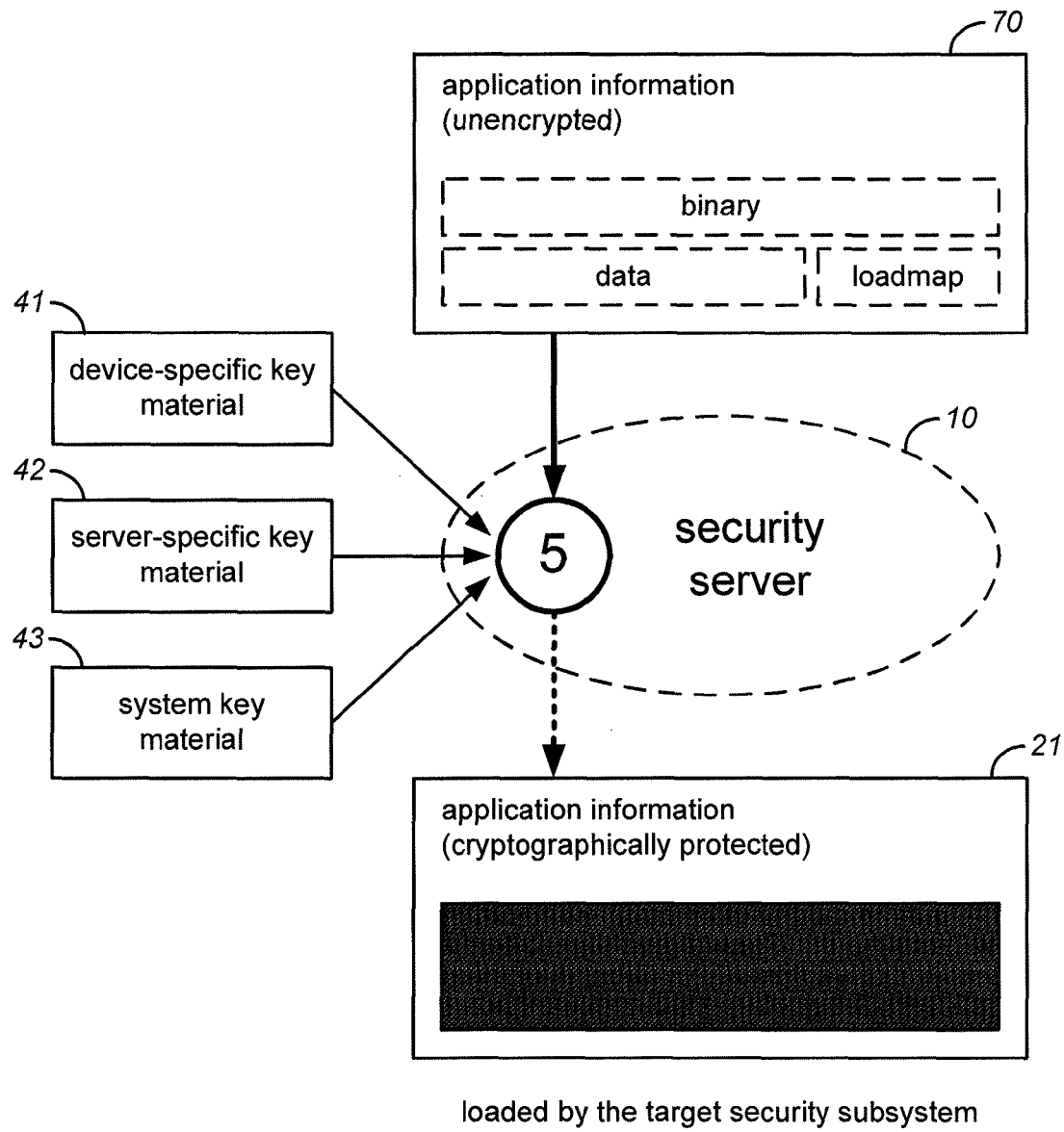
FIG. 7 illustrates generation of application information images.

FIG. 7 illustrates data flow 5, earlier shown in FIG. 2, used for the preparation of application information images 21 by the security server 10. As illustrated, unencrypted application information 70 is provided to the server 10. In this case the security engineer for the project being managed creates application templates for use by the application developers. The engineer distributes header files which describe the templates to the application developers. The developer for the project then generates the desired binary files and optional data files using the information provided by the security engineer. The developer also may optionally submit the required files to the server for a particular application to update a fielded system. When generating an application image, the key material 41, 42 and 43 described above is used as specified by the security engineer when the specific application template is created.

In the case of data flow 5, the input data consists of software binary application files, any data files, and a load map which describes how the binary files and the data files are to be loaded on the target device. The cryptographic protection typically consists of device specific and server specific materials. System key material can also be used if it is loaded by the target security subsystem.

By using asymmetric server specific material, image creation can be limited to a particular group of security servers. The application image data can be loaded into the target microprocessor. The processor-based applications and programmable logic-based applications also can be programmed by the security subsystem. The server 10 can create images that support power-up configuration, as well as later target re-configuration. As a result, the subsystems contained within the target microprocessor can be programmed by the security subsystem.

The application template also defines a boot component. A boot component consists of an identifying index number, a key index used by the secure microprocessor to identify the key material required to decrypt the boot component, application-specific key material, the application to be loaded, and other necessary information for the application to be loaded. Such information includes information such as the code foot print and destination addresses to which the application is to be loaded. Additionally the boot component can specify security configuration overlays which include specific revisions to the target device security configuration to be applied when that particular boot component is loaded.

Figure 8:
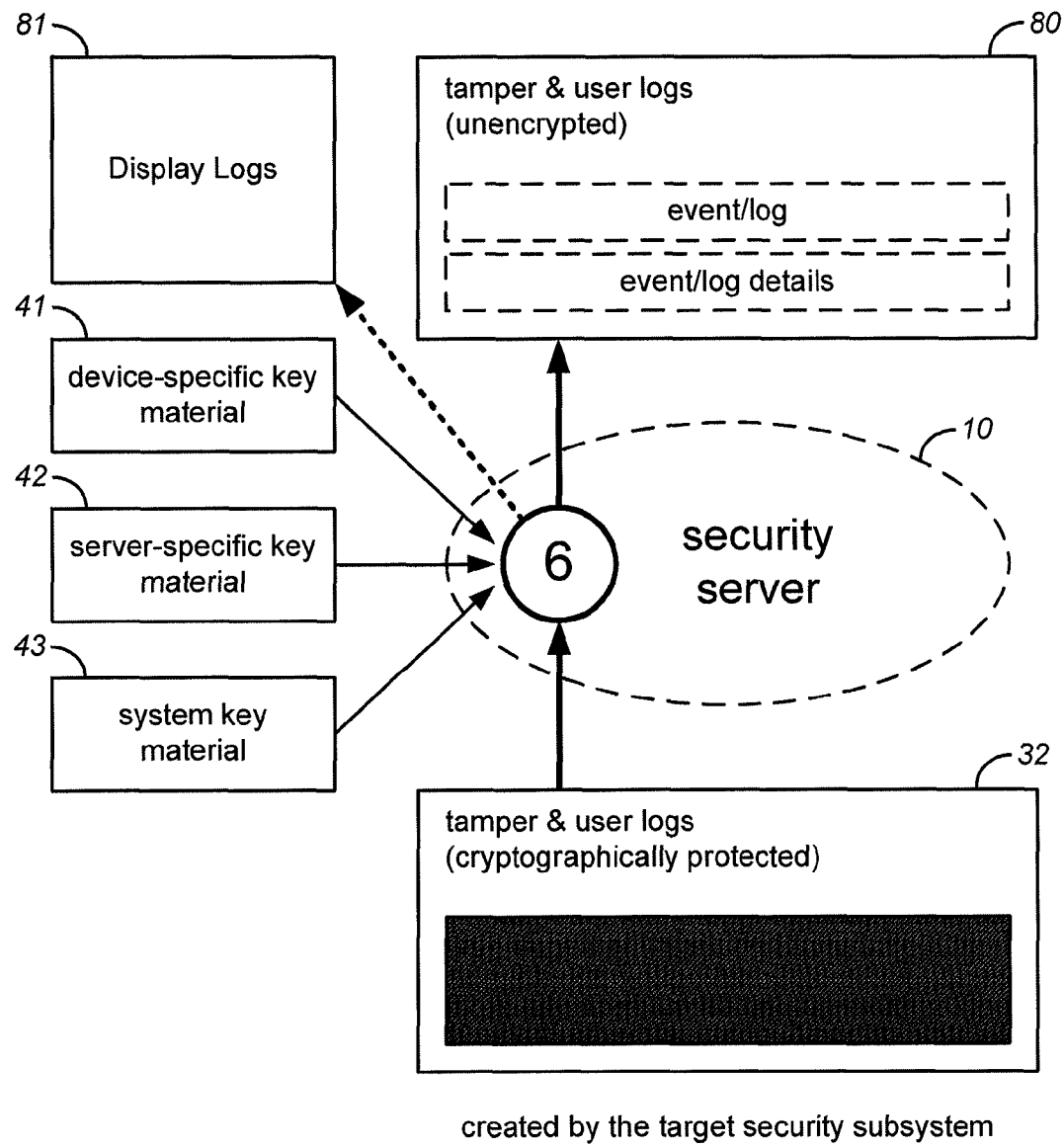
FIG. 8 illustrates operation of security server for reviewing tamper logs and user logs.

As suggested by FIG. 8, the secure microprocessor maintains a special 'Tamper Log' created by the security subsystem in the target device. This log records important events regarding the security of the secure microprocessor. The secure microprocessor may also keep a user log which tracks various events. Each of these logs can only be read by a security server with the configuration that created the assembly of the fielded secure microprocessor. The logs are encrypted and can only be read by the security server configuration used to create the fielded secure microprocessor.

FIG. 8 illustrates operation of the security server 10 in conjunction with the tamper and user logs 32, discussed above and earlier shown in FIG. 2 as data flow 6. These tamper and user logs provide the security engineer with information about whether the secure microprocessor has incurred any events deemed significant by the security engineer. As a result of this functionality, the flow of information usually will be from the target device 1000 to the server 10. As shown by FIG. 8, using key material 41, 42 and 43, the tamper and user logs will be decrypted and provided as an event log 80 which also includes event log details. Optionally a display of the logs 81 can also be provided.

A log generated by the fielded secure microprocessor security subsystem can be retrieved from the system. The security engineer for the application being managed by that server 10 submits the event or user log to the server 10. The server then decrypts the log and displays, or otherwise reports, the contents of the log. The use of server specific key material binds the logs to the particular server 10. The use of device specific material binds the logs to a particular set of target devices. The use of asymmetric system key material limits the log creation to a particular set or subset of fielded secure microprocessors.

The security server 10 may be used to diagnose or 'fix' a manufactured secure microprocessor. There are three typical circumstances: (i) log retrieval, (ii) device restoration and (iii) manufacture repair. Log retrieval, described above, enables determining what happened to a fielded secure microprocessor. This scenario assumes that the "normal" technique for downloading the logs is unavailable because the device has been disabled, the non-volatile storage is damaged, or some other issue has occurred which prevents normal retrieval. The security server configuration used for manufacturing contains all of the information necessary to extract the logs from the non-volatile storage and display its contents. Device restoration is needed when the manufacturer wishes to recover a fielded secure microprocessor to an operational mode. The process assumes the non-volatile storage for the device has been destroyed and/or corrupted to the extent that it cannot be used for booting the part. Before device restoration can occur, the non-volatile storage for the target must be operating correctly. The security server configuration used for manufacturing contains all of the information to store the archived assembly onto the target secure microprocessor.

Recovery of a disabled or inoperative secure microprocessor requires two steps. First the device must be restored to an operational state. This involves the use of archived images for the device with the device connected directly to a security server. The security server uses the archive images and identifies the specific data that successfully returns the device to an operational state. Once this occurs, the security logs can be retrieved. Next the device is recovered by creating a new boot image based on the identified data from the archive assembly. Original component data or the manufacturing assembly is then used to create the boot image.

Figure 9:
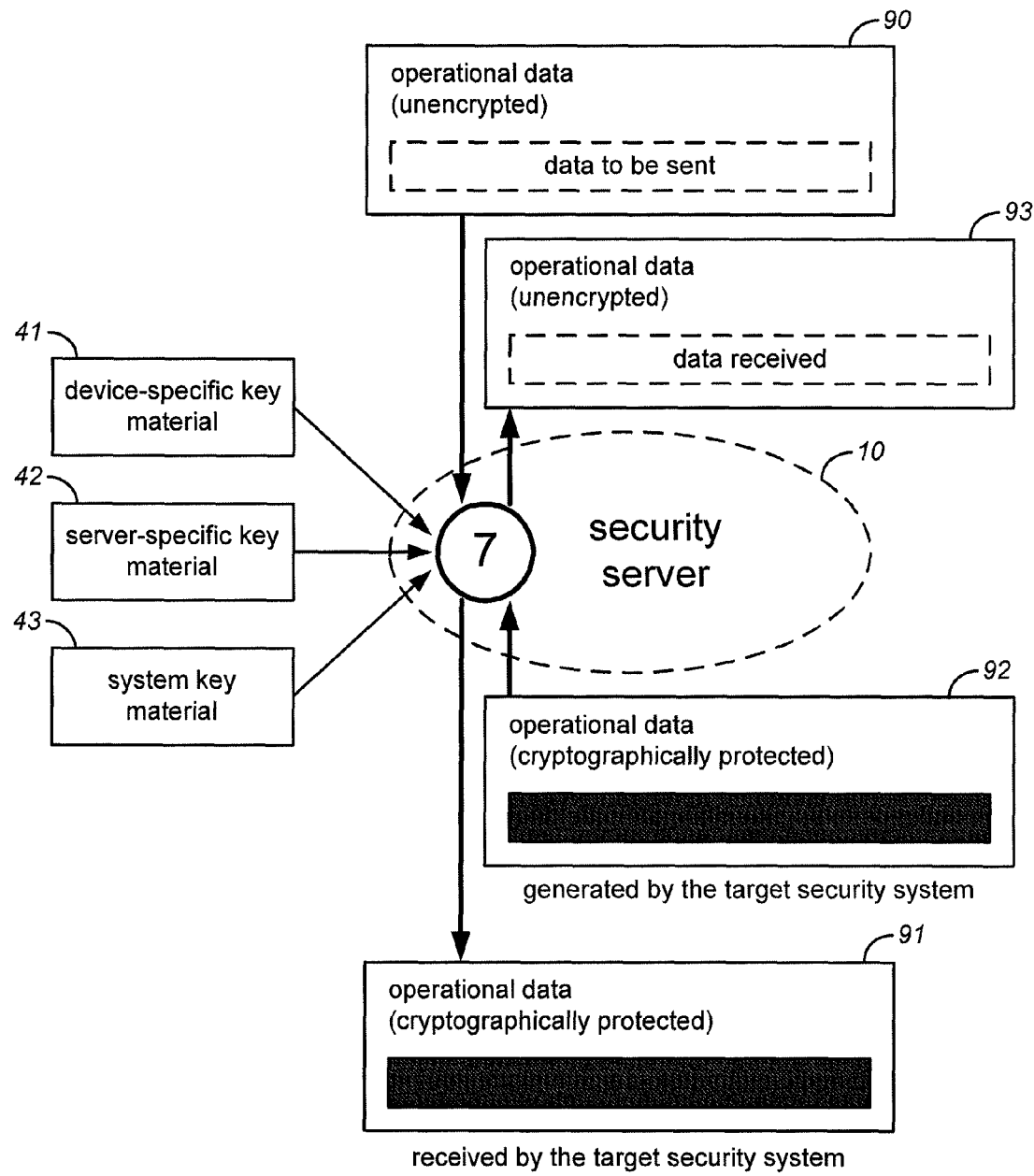
FIG. 9 illustrates operation of the security server for sending and receiving operational data to and from the target secure microprocessor.

Another data flow of the security server is illustrated in FIG. 9. This use generates operational data to be sent to the target device, and receiving operational data from the target device. This data flow 7 was also discussed above with regard to FIG. 2. As illustrated by FIG. 9, unencrypted operational data 90 can be provided to the security server 10, encrypted and then received by the target security system as encrypted data 91. In the opposite direction, encrypted operational data 92 generated by security system on the target can be provided to the server 10, decrypted, and provided as unencrypted data 93.

Regarding this operation of the security server 10, the security engineer for the application being managed by the server 10 will create operational data templates. That individual can also configure access privileges for the various templates created. An application developer for an application with access privileges to a particular data template then submits the data to be cryptographically protected to the server 10. The server protects the data and sends it to the fielded target device so it can be loaded into the security subsystem of the target device 1000. Data flow in the opposite direction is handled by the individual having access privileges to receive data from the fielded target device. That individual submits the cryptographically protected data to the security server 10, which then decrypts and authenticates the data. As with other aspects of server 10, the use of server specific key material binds the data the security server. The use of device specific material binds the data to a particular one or set of fielded security subsystems. The use of an asymmetric system key limits data creation to the particular servers and subsystems authorized.

Figure 10:
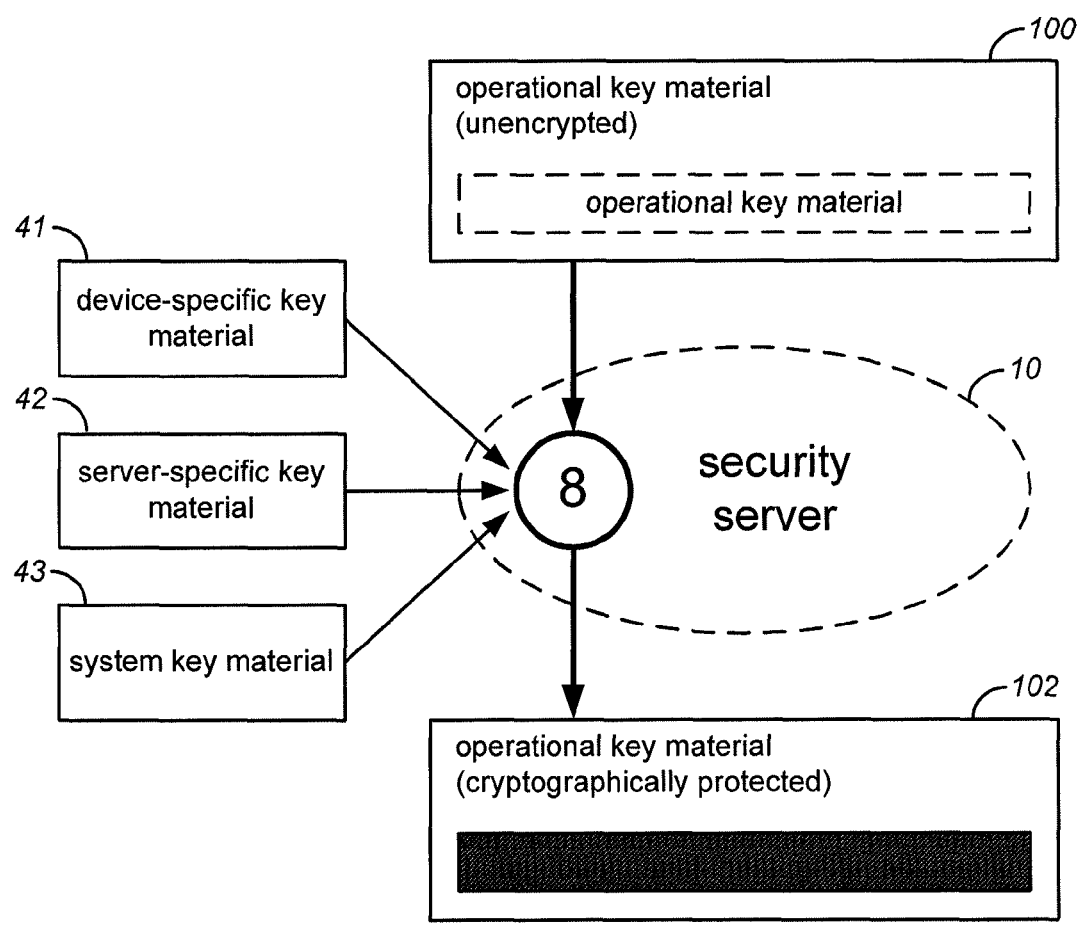
FIG. 10 illustrates the generation of operational key material by the security server.

FIG. 10 illustrates the step of generating operational key material 102, also earlier shown as data flow 8 in FIG. 2. Again using the key material 41, 42 and 43, the server 10 receives the operational key material 100 and encrypts it to provide cryptographically protected key material 102 which is loaded by the security subsystem of the target device. In this circumstance the input data consists of operational key material which is to be used by the security subsystem of the target device during its operation. Information is created by the security engineer in the form of operational key material templates, either for a new target device, or for a device already in the field. Using the key material 41, 42, and 43, the operational key material 100 is encrypted and provided. As above, using server specific key material 42 and device specific key material 41 binds the operational key material to the particular server and the particular set of fielded target security subsystems. The use of asymmetric system keys limit operational key material creation to a group of security servers.

Figure 11:
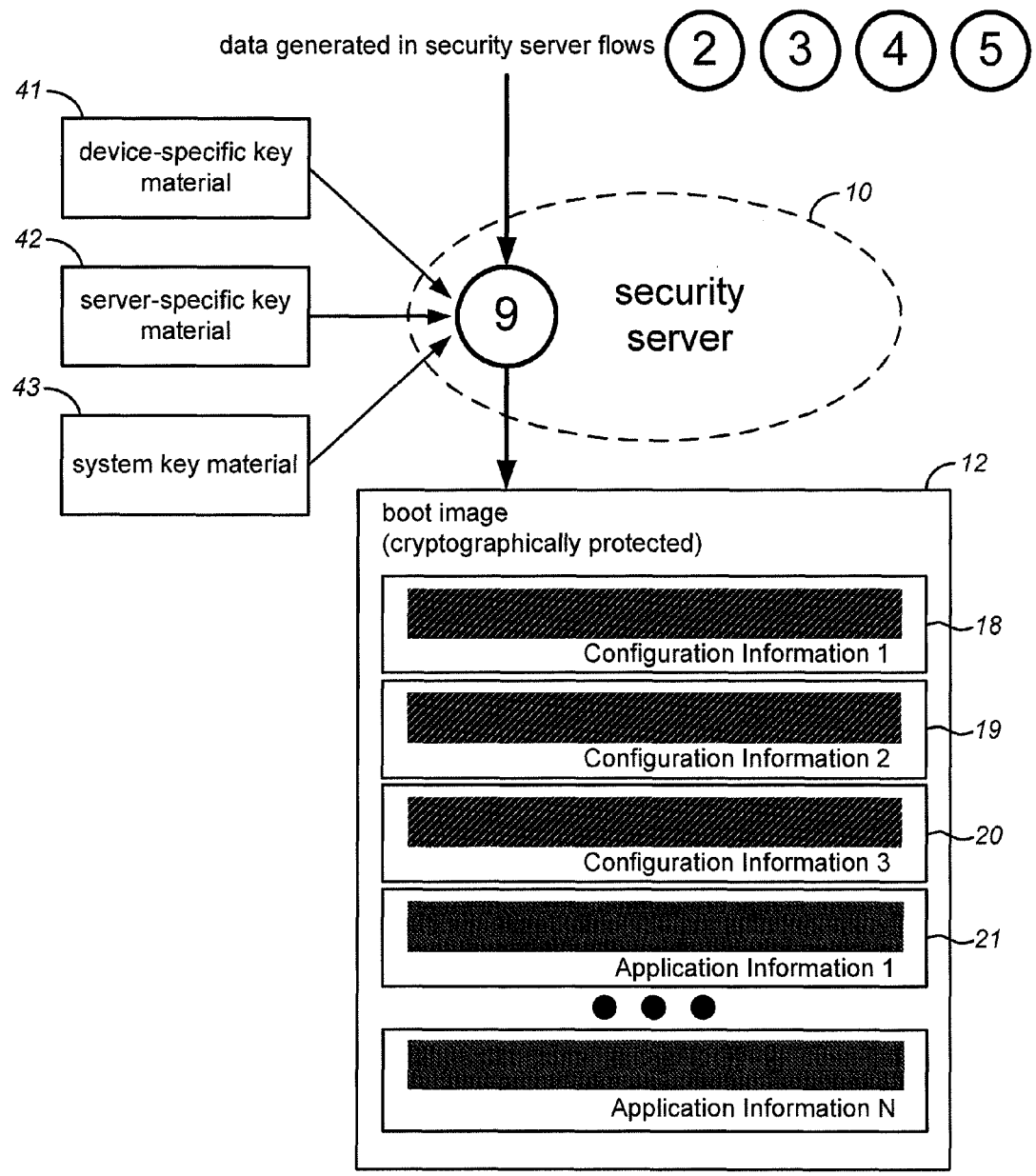
FIG. 11 illustrates the generation of a boot image for the secure microprocessor by the security server.

FIG. 11 illustrates the step of generating a target device boot image 12 previously referenced as data flow 9 in FIG. 2. Using the data generated in the security server, previously described above in conjunction with FIGS. 3-7, server 10 prepares the boot image 12 and cryptographically protects it. In this case, the security engineer has collected the necessary data to provide it to the server 10, which then generates a complete boot image for the security subsystem in the target device 1000. As discussed in conjunction with FIG. 2, the information provided typically consists of the target security subsystem configuration information and as many sets of application information 21 as appropriate for the particular use of the target device.

The target device boot image 12 via data flow 9 is a security server function which generates both the initial boot image, and any necessary field update images, for the secure microprocessor, i.e. target device. Assembly creation insures the integrity of the security configuration for the secure microprocessor, as well as the content for any application to be loaded. When generating images, the security engineer can choose from the defined target device configurations and create an image from components chosen for the templates created within the selected target device configuration.

This configuration service is a combination of software to manage the security configuration of the target device, together with appropriate application images. By assuring only valid configurations are accepted and stored, it provide a process to assures integrity of the storage and use of the target device configuration data. It also assures that either no configuration or only a single configuration is stored in the target device at any one time. This configuration service enables erasing the current configuration, determining that a valid configuration is currently stored, and saving the appropriate configuration to a non-volatile device.

The key service provides generation of keys that can be uploaded into another security server secure microprocessor management system. It assures integrity of the key creation process and supports a choice of key types and attributes for key rings, as defined by the security engineer within the target device configuration. It also assures that key creation is only possible with a valid security configuration, and provides mechanisms to upload keys generated from other tools, either manually or randomly generated.

Next we describe use of the security server 10 during the customer's development phase. In this circumstance, application developers create images for their own boards. First, an initial secure microprocessor boot image is created by the security engineer and programmed to the boards. This image is used to configure the secure microprocessor as deemed appropriate by the security engineer for use during the customer's development phase. The security engineer and developers can then access the security server 10 to either create complete boot images or individual application images which can then be programmed onto their respective boards. The security engineer incrementally configures the various security aspects of the secure microprocessor, while the application developers integrate those changes into their applications.

Once a project is ready to proceed from the development phase to the production phase, the process proceeds by customizing additional secure microprocessors and programming of their flash devices with a production boot image. This process is summarized below:

1. The security engineer provisions a security server for the project as previously described, including the specification of any project-specific information such as a customization value and/or an activation value. This project-specific information is customer-specified data that becomes part of the security configuration used by the secure microprocessor to activate various security capabilities in the target device and to make the device uniquely programmable only by the customer's security server devices which know this secret.

2. The security engineer creates the final secure microprocessor operational boot image containing the final security configuration and final application images.

3. The security engineer archives the final configuration and associated key material. Both the configuration and key material can remain in the security server to be used in the process.

4. The security engineer creates a manufacturing boot image using the completed application code, key material and user data. The manufacturing boot image is representative of the application code, key material and application data that is used in the manufacturing process for production of the secure microprocessors.

5. The security server and the manufacturing boot image are delivered to manufacturing and the security server's network settings are updated as appropriate.

6. The security server is physically connected to the secure microprocessor via a physical interface such as a Serial Peripheral Interface bus (SPI).

7. The manufacturer uploads the manufacturing boot image into the security server and initiates the security server's manufacturing flow as follows:

a. The security server creates a customization/activation boot image and programs it to flash memory on the board being manufactured while holding the secure microprocessor in reset.

b. The security servers releases the secure microprocessor from reset and the secure microprocessor loads and processes the customization/activation boot image.

c. The secure microprocessor customizes/activates itself and writes any device-unique information to the flash memory on the board being manufactured.

d. The security server reads any device-unique information from on-board flash memory.

e. The secure microprocessor and security server validate that the project-specific information has been programmed correctly.

f. The secure microprocessor and the security server validate that device-unique information has been communicated correctly.

g. The security server removes the data from the on-board flash memory and writes the appropriate operational boot image while holding the secure microprocessor in reset.

8. The security server provides the archive information to the host machine so it can be saved to an appropriate mass storage device connected to the host machine.

9. A new secure microprocessor is connected to the security server and the process repeats from step 6 as required.

Figure 12:
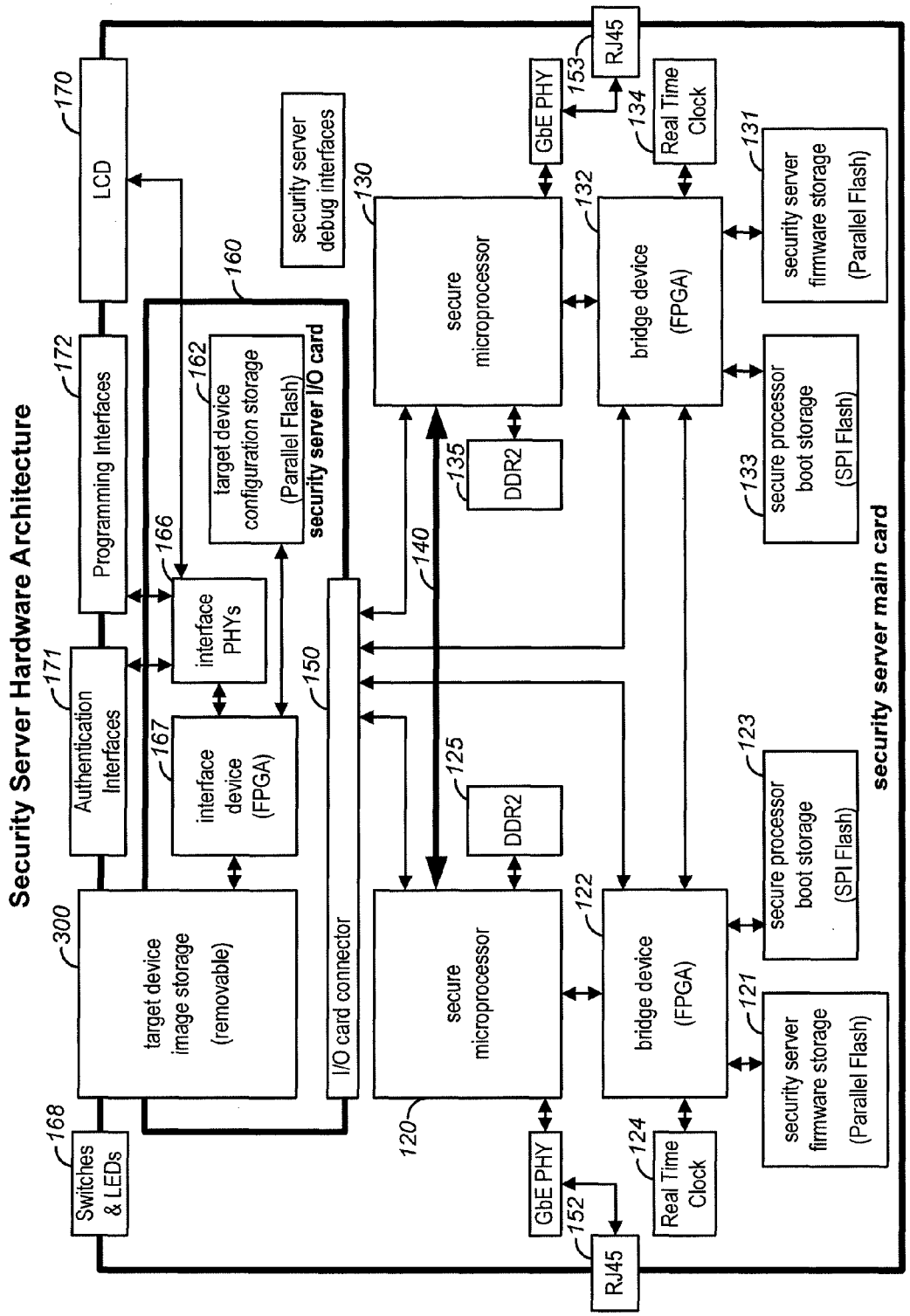
FIG. 12 is a block diagram of the hardware architecture of the security server.

We next describe the structure of a preferred embodiment of the security server 10. FIG. 12 is a hardware block diagram of the security server 10. The security server is built using two secure microprocessors, with a first 'user interface' processor 120 and a second 'target device configuration' processor 130. The processors are coupled to each other with a bus, e.g. PCI Express bus 140, and all data passing between the processors is encrypted. Each processor has associated with it memory 125, 135, a programmable bridge 122, 132 (coupled to SPI flash memory 123, 133), a real-time clock 124, 134, and other flash memory 121, 131. To provide external access, the processors are coupled to an input/output connector 150 and also to local area network connections 152, 153.

The security server uses these cross-coupled secure microprocessor devices, as shown in FIG. 12, to protect proprietary algorithms from reverse engineering, and to protect customer-proprietary information such as key material, obfuscation parameters, custom connection verification algorithms and application specific secure microprocessor security configurations. In the preferred embodiment the secure microprocessors 120, 130 comprise Acalis CPU872 microprocessors available from CPU Technology. As will be discussed below in conjunction with FIG. 13, each of the secure microprocessors is itself providing two application processors. While these four application processors (two in each of the two physically separate processors) also could be implemented by isolated portions of a single larger processor, the use of two separate secure microprocessors offers additional security facilitating separation of privilege, and enabling compartmentalization for security.

In FIG. 12, I/O connector 150 is coupled to an I/O card 160 which includes various interfaces such as RS-232 interfaces, LCD interfaces, and other conventional apparatus for communicating with external devices. An LCD display 170 is coupled to the system to provide a user display interface directly under the control of the security server. Although any appropriate display could be used here, in the preferred embodiment, the security server 10 uses an alphanumeric LCD output display of 4 lines by 16 characters per line, together with LED indicators 168. This enables display of target device status, such as, current IP address, error, notice, and configured. Also provided are input buttons or other input devices, such as a keyboard, to enable user input directly to the security server. Support is provided for power-off detection and to execute code that clears critical data from volatile memory.

The security server's non-volatile memory includes four sections of storage spread across six physical components. This arrangement of physical devices and their strict associations with either security server-specific data or customer-specific data is not critical, but allows for easy sanitization procedures to be implemented for and employed by the customer of the security server. The operational boot images used to program the security server's two secure microprocessors 120, 130 are stored within separate secure microprocessor boot storage components 123, 133. The application images which contain the security server's firmware that runs on the cores within the secure microprocessors are stored within separate security server firmware storage components 121, 131.

The target device configuration storage 162 is non-volatile memory, preferably socketed, within which all configuration data is stored prior to being composed into complete images for a particular project. The target device image storage 300 is non-volatile memory, preferably removable, within which completely composed customization boot images, activation boot images, operational boot images, archive images and field update images are stored for use to program or recover a single target device or set of target devices on the customer's premises or in the field. The latter two storage types, namely the target device configuration storage 162 and target device image storage 300 are the only non-volatile storage in the security server that holds customer data. As noted, it is preferred that the target device configuration storage 162 be socketed so that the process of sanitizing that portion of the customer's data from the security server is simply a matter of removing the physical component from the security server. Similarly, it is preferred that the target device image storage 300 be removable, not only to ease the process of sanitizing that portion of the customer's data from the security server, but to enable the security engineer to safely store the sensitive boot images used to program target devices and the archive images created by those target devices during the various programming processes. Authentication interfaces 171 enable the security server to employ multi-factor authentication thereby increasing security. Various programming interfaces 172 to allow the security engineer to pull information from the target system or a security engineer/authorized individual to directly program a target device using a customization boot image, activation boot image or operational boot image located within the target device image storage 300.

The secure microprocessors 120, 130 in the security server 10 typically provide at least one cryptographically strong hash algorithm from a desired set, e.g. MD5, SHA-1, and SHA-256. The selected algorithm is used to create a 'cumulative hash', that is, a hash created from multiple data fragments. They provide a symmetric encryption algorithm, such as AES, with various modes. Secure microprocessors 120, 130 also provide key management services necessary to create keys, store keys and manipulate/derive keys as required. Key material may be either stored by the processors, or if generated elsewhere, passed to the algorithms running on those processors. The storage of created keys may be temporary or preserved between power cycles of the security server.

The secure microprocessors 120, 130 enable storing updated boot images containing the configuration of the secure microprocessors themselves in the secure processor boot storage 123, 133, the firmware for the security server in the security server firmware storage 121, 131 and control the booting of each application processor within the secure microprocessors. When a warm restart for a particular application processor within the secure microprocessor is initiated, the secure microprocessor's security subsystem 'resets' the application processor, loads the next application image to be run by that application processor and releases the application processor from reset.

To provide additional security of the firmware run by the security server 10, the executable components are protected utilizing the secure boot features of the two secure microprocessors 120, 130. Multiple secure microprocessor operational boot images are stored within the secure microprocessor boot storage 123,133 while multiple application images for each of the two application processors are stored within the security server firmware storage 121, 131. Two 'groups' of application images are provided per application processor. One group is a "golden" or "backup" group, representing the application images at the time the device was manufactured. The other group is a "field-upgrade" or "primary" group, representing the application images of the device that have been loaded by the customer after the initial configuration. The boot sequences are controllable by the security subsystems within the secure microprocessors, with the security server's primary boot images being used if present. Otherwise the golden boot and application images are used.

The security server provides the security engineer the ability to 'Clear' the security server by pressing and holding a front panel button. Clearing is the process of sanitizing all user data stored within the target device configuration storage 162 on I/O card 160, and optionally the target device image storage 300, also on the I/O card 160. Clearing the security server is typically performed prior to reusing the security server for a different project. This allows a security engineer to use a security server for multiple projects, and provides protection for the data that was stored on the media before clearing. Additionally, the security server provides the security engineer the ability to 'Erase' the security server by pressing and holding another front panel button. Erasing is the process of sanitizing all data stored within the security server. Erasing the security server is typically performed prior to returning the security server to the assignee. This allows the customer to return servers once they are no longer needed by the customer. In both cases, all external non-volatile memory, internal memory, buffers, or other reusable memory is sanitized using well-known approaches to effectively deny access to previously stored information.

The security server firmware employs a typical licensing procedure. In addition to an arbitrary number of developers, updaters and manufactures, the security server has two dedicated users, namely 'admin' and 'security'. The admin user has rights with regard to the security server to (i) perform network configuration, (ii) unlock the security server, (iii) create and manage user accounts, (iv) save or restore user accounts, (v) perform field updates of the security server's firmware, (vi) erase the security server, (vii) sanitize the security server, and (viii) manage passwords. Security users have rights to (ii), (vi) and (vii), as well as create, export and load target device configurations, and read the activity log. The security user is typically the security engineer.

The security server also can be configured by the assignee herein to use multi-factor authentication during security server activation. For example, the server can be configured by the assignee to require the customer to activate the security server by inserting a USB security token into one of the security server's authentication interfaces 171 prior to applying power. This token can be supplied to the customer by the assignee via a different delivery mechanism than the security server itself thereby providing additional security for the security server through the supply chain. Once received and any required security tokens inserted, the admin user is then allowed to log into the security server 10 and changes the default password. "Device Info" from the security server is then downloaded and sent to the manufacturer to obtain the required license. Upon receipt of the license, the admin user again logs into the security server. The license is uploaded, thereby completing the activation process of the security server. At this time, the network configuration is updated if necessary.

After the security server is activated and unlocked, the admin user is enabled to create user accounts, and the security user is enabled to log in. Upon logging in for the first time, the security user is prompted to change that individual's default password and to provision the security server. Once provisioned, the security engineer can use the security server in the manner described above to create target device configurations, application templates and input key material. Once a target device configuration has been created, developers and updaters can generate boot images, application images, key collections etc. If so enabled, both the admin and security engineer may archive their information to external media in addition to the local storage contained on the main card and I/O card of the security server.

When exporting or saving project information from the security server, a multi-part key is used to encrypt the information. The user exporting or saving the information can specify which portions of the multi-part key are used, along with an optional file password. The multi-part key limits the exposure of project information to only known security servers, and allows project information to be shared across specific projects as desired. The multi-part key preferably consists of the security server license information, the security server provisioning information and a master key.

Enabling only the security server license information, configured as part of the security server activation process, assures that the information can only be imported/loaded by security servers which are licensed to that particular customer. This selection enables updating all security servers owned by a particular customer. Enabling only the security server provisioning information, configured by the security engineer during the project provisioning process, assures that the only information that can be imported by that security servers is information specifically for a particular project. This selection typically is used when a customer wants to update security servers independently of their licensing information. Enabling both portions of the multi-part key locks the exported/saved information to a specific 'group' of security servers and prevents the information from being loaded by other than the designated group of security servers.

Disabling both portions of the multi-part key unlocks the data so it can be loaded by any security server. This function is typically used for sending updated server software to all customers. It can also be used by a customer needing to transfer common information among security servers which do not share the same license information, and which have not been provisioned for the same project. In all cases, the master key portion of the multi-part key is used to ensure that the information is encrypted. An optional password can be used to limit the ability of someone who might independently acquire exported information from accessing that data on an authorized security server. In short, the master key assures confidentiality of the information, while the other parts of the multi-part key restrict applicability of the information to authorized security servers. The password prevents the information from being loaded other than an authorized individual.

Sometimes it may be necessary to restore a previously saved target device configuration or a user account. This is useful if the security server is damaged and needs to be replaced, or if it is corrupted due to environmental conditions and needs to be restored to a previous condition. The archived target device configuration user accounts can be imported onto a new security server depending on which parts of the multi-part key were enabled when saving the archive.

The security server maintains its own 'security server activity log' of notable events. The types of events logged are configurable, but typically include log in records, activity records, and password failures. In addition, the security server has a tamper event log which can be used to detect specified events in the security server itself.

The process of clearing the current target device configuration or the security server firmware requires the user to press a button on the security server. Rules implemented within the server distinguish the subset of information to be cleared. If target device information is present in the non-volatile storage of the security server, pressing and holding the 'Clear' button will sanitize that configuration from the security server. This process essentially restores the device to its 'factory presets' and allows the admin and security users to once again activate, provision and configure the target device for a particular project. Pressing and holding the 'Erase' button will sanitize, not only all user data, but the security server firmware. This process completely erases all information in the non-volatile storage of the security server, and renders the security server inoperable.

Key collections are databases of key material. Key material as used herein not only refers to the master key itself, but to attributes about how it is to be used within the secure microprocessor. Key collections can be associated with target device configurations, assuming their defined key ring templates are similar. Key collections are essentially companions to target device configurations, but are managed independently from the target device configurations. This allows the key material to be re-used and updated independently.

The security server is coupled to a Client, a computer graphical user interface which runs on the security server, and is displayed on a host computer connected to the security server. The device maintains a user-created target device configuration for both the security features of the secure microprocessor and its general purpose components. The Client interface running on the host computer enables the security engineer to configure the target device in the manner described herein.

Figure 13:
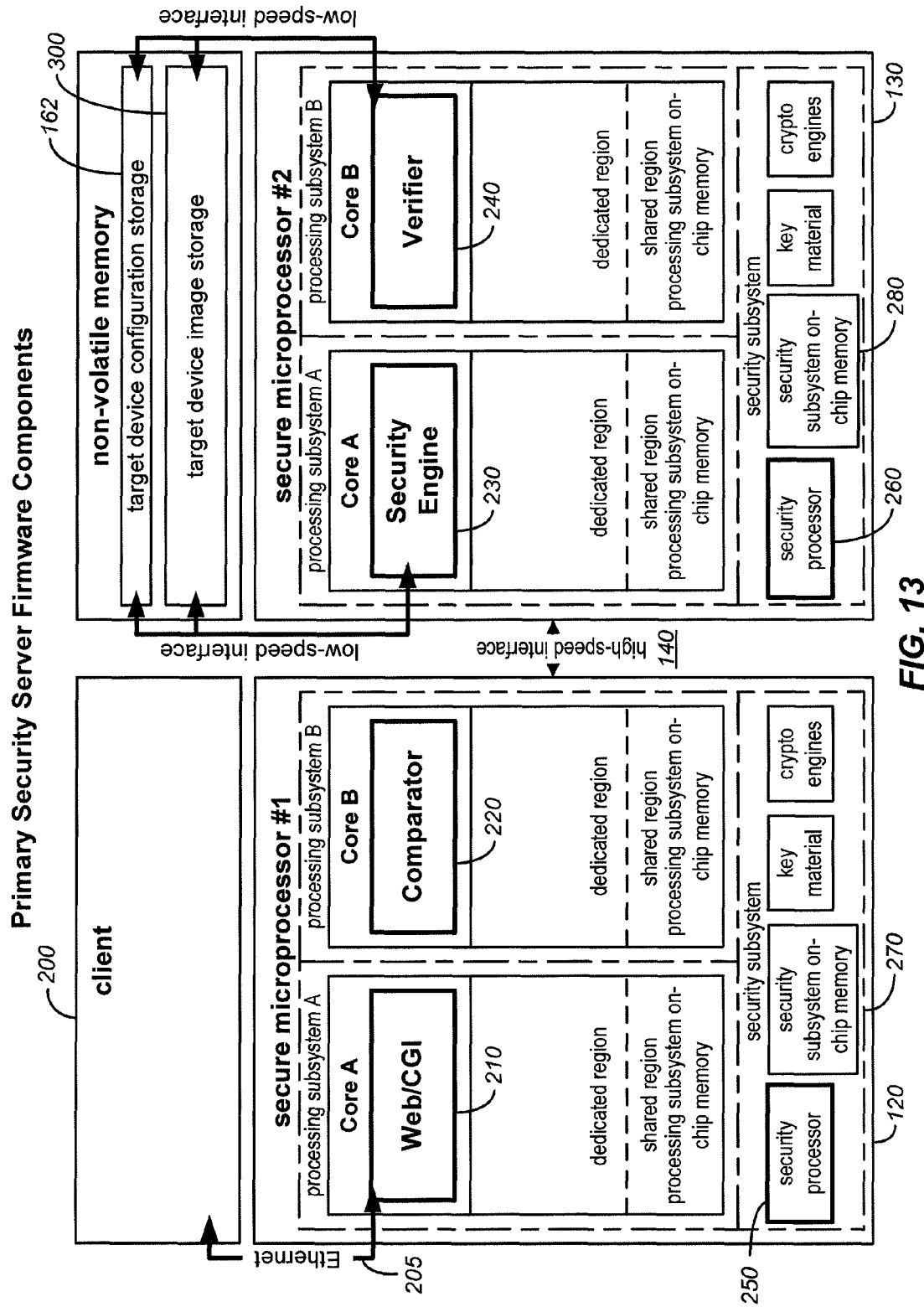
FIG. 13 illustrates primary firmware components of the security server.

FIG. 13 is a diagram illustrating the primary firmware components of the security server's software architecture, a hardware implementation of which was described in conjunction with FIG. 12. FIG. 13 illustrates how four applications are partitioned across the cores within the two secure microprocessors 120, 130 and how they interface with the Client and non-volatile memory. The Client 200, is the end-user application that provides the graphical user interface to the security server. This Client 200 is connected to microprocessor 120 via an Ethernet (or other suitable) connection 205. The Web/Common Gateway Interface (CGI) 210 is the web server and provides functions that serve the Client 200 and utilize other software interfaces. The Comparator 220 uses the secure microprocessor's security processor 250 to perform cryptographic tasks, and to compare hash values provided during various stages of data flow, as described below. The Security Engine 230 on secure microprocessor 130 provides interfaces to the specific services related to that secure microprocessor 130. The Verifier 240 verifies the actions of the Security Engine 230. The secure microprocessor connection 140 is a high-speed hardware communications bus, preferably PCI Express or other high-speed interface, connecting the two secure microprocessors 120, 130. It is not assumed to provide secure bus transfers, and preferably all communication on that bus is encrypted. The functional components require on-chip memory 270, 280 which in the preferred embodiment is embedded DRAM (eDRAM). The integrated security processors 250, 260, along with hardware offload engines provide cryptographic and security related services. The Web/CGI 210 and the Security Engine 230 are partitioned to operate on different application processors within the two secure microprocessors 120, 130. The Comparator 220 and the Verifier 240 are similarly partitioned.

The security server's hardware and software architectures mitigate single-point vulnerability or compromise. The various components in the security server communicate securely with each other using a combination of asymmetric and symmetric keys. The Web/CGI 210, Security Engine 230 and Verifier 240 each establish separate, secure communication links with the Comparator 220. Those communications pairs use public/private key exchange to establish a symmetric key that is subsequently used for encryption of all messages between the pair. All keys for the Web/CGI 210, Security Engine 230, Verifier 240 and Comparator 220 are managed by the integrated security processors within the secure microprocessors and are therefore not directly accessible by any of the firmware components.

The remaining figures describe the operation of the security server in four of its primary functions: storing target configuration data, verifying target device configuration data, uploading an application image and down loading an application image. All of these functions serve to configure the target device and to assure that configuration is as intended. In these figures, any connectors represent 'soft' interfaces between distinct modules. Those with arrows typically indicate an external interface.

Communications among the various firmware components shown in FIG. 13 are cryptographically protected using standard asymmetric public-key cryptography and symmetric-key algorithms. The required key exchanges operations are described first, followed by a discussion of the operational aspects of the system. Key exchange operations, managed by the security processors within each secure microprocessor 120, 130 are required each time a secure communication path is needed between two of the functional components within the security server. For example, when the Security Engine 230 needs to securely communicate with the Comparator 220, it initiates a key exchange operation with the Comparator 220. Upon initiation, the security processors within the secure microprocessors establish a symmetric key using preloaded public/private key pairs for the Security Engine 230 and Comparator 220 respectively. Preloading public/private key pairs for each component into each secure microprocessor mitigates man-in-the-middle (MITM) attacks. Once a symmetric key has been established, that symmetric key will only be used by the security processor to cryptographically protect data between the two components for which the symmetric key was created, e.g. the Security Engine 230 and the Comparator 220. The security processors ensure that keys can only be used by the appropriate firmware components, e.g. the Verifier 240 is not allowed to request the security processor use a key that was established to protect communications between the Security Engine 230 and the Comparator 240. As needed, symmetric keys are updated using the key exchange method described above, with each exchange creating a new session key. The Verifier's 240 exchange with the Comparator 220 and the Web/CGI's 210 exchange with the Comparator 220 are performed in the same manner as the Security Engine's 230 exchange with the Comparator 220 described above.

The key exchange operation required is used to protect communications between the two secure microprocessors within the security server. This exchanged is initiated by the Web/CGI 210 and the Security Engine 230 on each of the secure microprocessors respectively. Once a symmetric key has been established, that symmetric key is used to encrypt all data sent between the Web/CGI 210 and the Security Engine 230.

Figure 14:
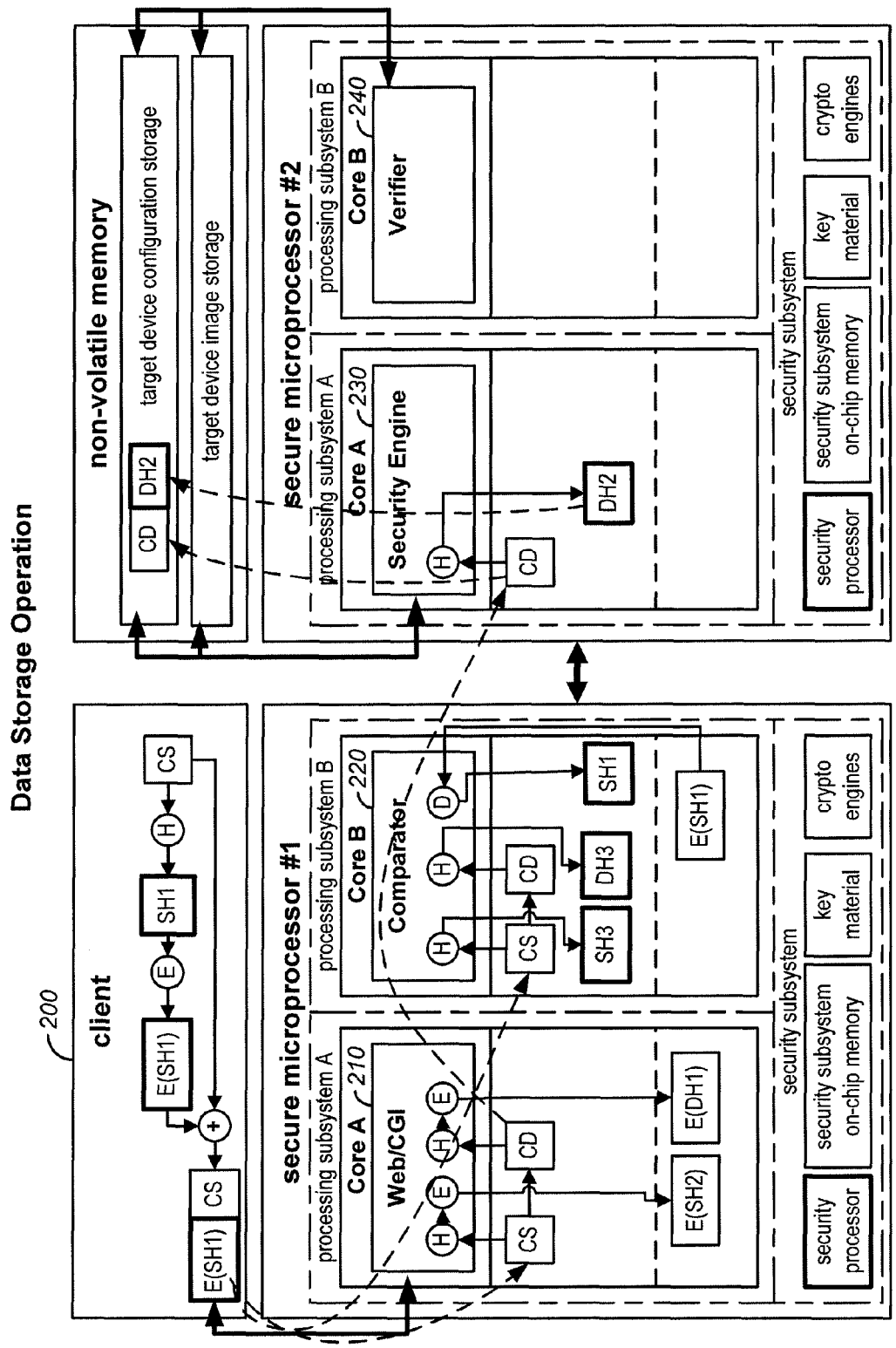
FIG. 14 illustrates storing of the boot image data into a flash memory.

When storing data, e.g. target configuration data to non-volatile memory 162, a two-step process is performed. Specifically, the data is first stored to the non-volatile memory 162, and then it is verified. FIG. 14 illustrates the security server's storing operation, that is, the storing of target configuration data into non-volatile memory 162. The operation begins with receiving information and associated target device configuration settings from the Client 200. The target device configuration settings are hashed (SH1) by the Client 200 using a hash-based Message Authentication Code (HMAC) which the Client 200 then encrypted and combines with the original target device configuration settings and sent as separate, cryptographically protected messages to the Web/CGI 210 and Comparator 220.

The Web/CGI 210 decrypts the message, generates its own HMAC (SH2) of the target device configuration settings, and parses the target device configuration settings to create target device configuration data. The Web/CGI 210 creates its own HMAC (DH1) of the target device configuration data, encrypts the target device configuration data, and sends it to the Security Engine 230 using a key shared by the two components. The Security Engine 230 decrypts the message, generates its own HMAC (DH2) of the target device configuration data, and stores the target device configuration data and generated HMAC into non-volatile memory 162. In a similar manner to that of the Web/CGI 210, the Comparator 220 decrypts the message, generates its own HMAC (SH3) of the target device configuration settings, parses the target device configuration settings to create target device configuration data and generates its own HMAC (DH3) of the target device configuration data.

Figure 15:
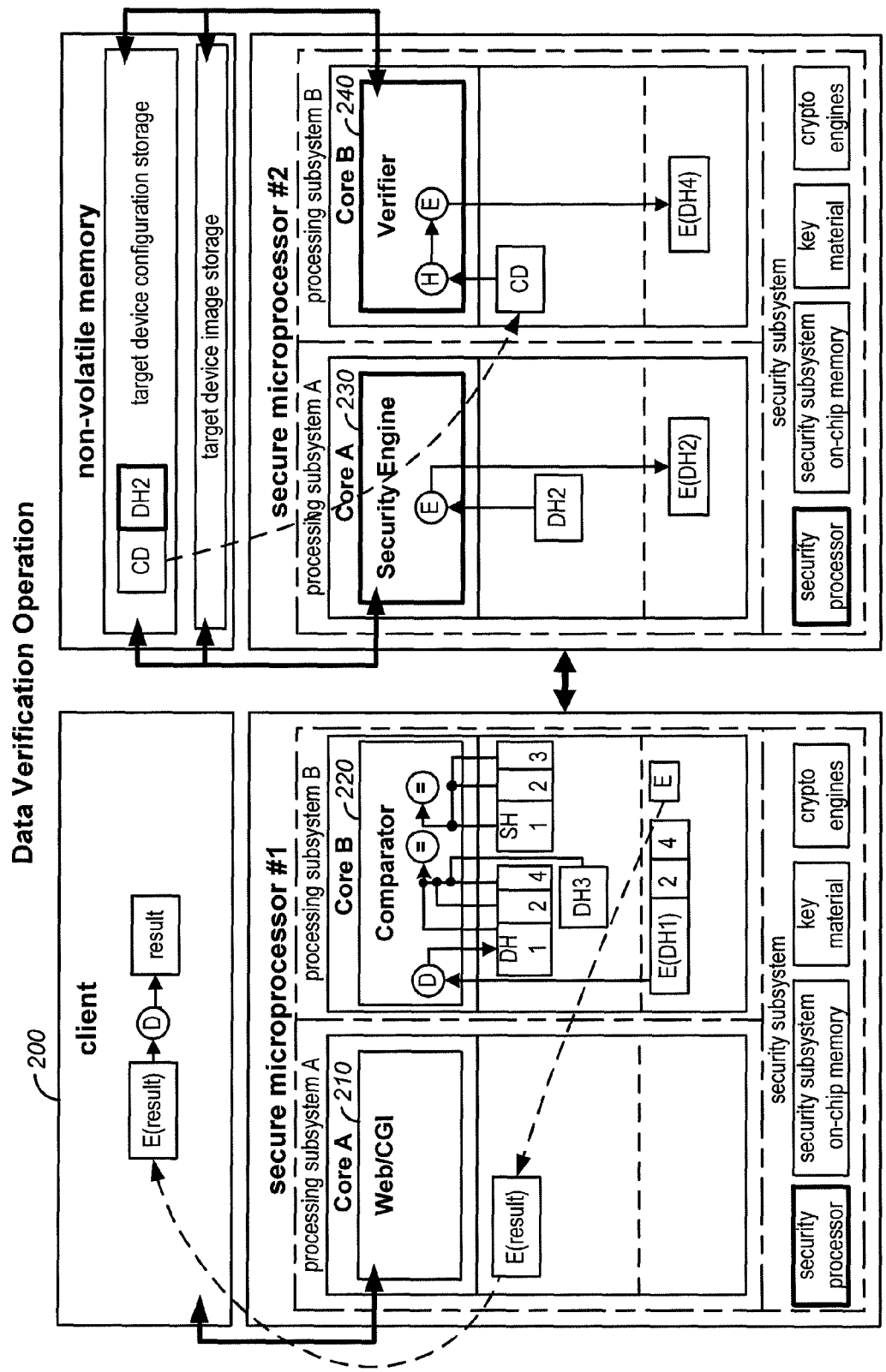
FIG. 15 illustrates verifying the stored boot image.

FIG. 15 illustrates the security server's verification operation, e.g. the verification of a target configuration data previously stored in non-volatile memory 162. This operation ensures that data, such as target device configuration settings, provided by the Client were correctly processed and stored into non-volatile memory 162. The process begins with the Verifier 240 reading the stored target device configuration data from non-volatile memory 162. The Verifier 240 generates its own HMAC (DH4) of the target device configuration data. The Verifier 240 then encrypts its HMAC using a key it shares only with the Comparator 220 and places the ciphertext into shared on-chip memory. In parallel, the Security Engine 230 performs the same process and places its generated HMAC (DH2), encrypted using a key it shares only with the Comparator 220, in shared on-chip memory. The Comparator 220 retrieves the two ciphertext values, decrypts them to produce DH4 and DH2 and compares them. When performing a verification operation immediately after a storage operation, the typical behavior of the security server, DH4 and DH2 are also compared against the target device configuration data HMACs generated by the Web/CGI 210 and the Comparator 220, DH1 and DH3 respectively. The Comparator 220 finally compares the target device configuration setting HMACs generated by the Client 200 and Web/CGI 210, SH1 and SH2 respectively, with its own target device configuration settings HMAC SH3. In this instance, the Web/CGI 210 encrypts its two HMACs SH2 and DH1 using a key it shares only with the Comparator 220 and places the ciphertext into shared on-chip memory. The end result of the various comparisons is encrypted and sent to the Web/CGI 210 for transmission to the Client 200.

Figure 16:
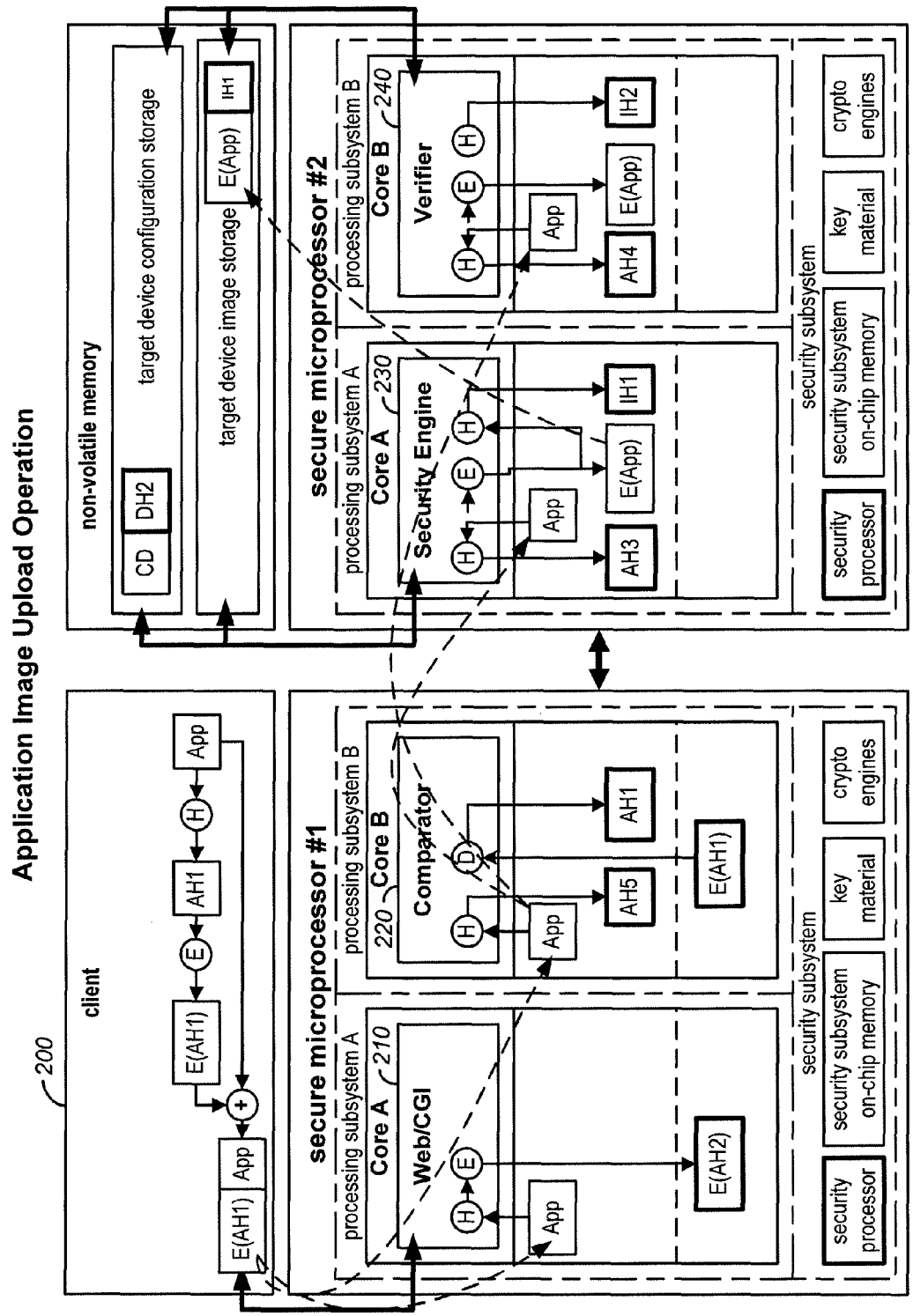
FIG. 16 illustrates uploading an application into the secure microprocessor.

In addition to target device configuration data used to configure the target device, the Client 200 also needs to load applications for particular projects into the target device. These applications are also protected by the security server. FIG. 16 illustrates the security server's upload operation in which an application is loaded into non-volatile memory 300.

This process involves encryption of the stored application image using a stored target device configuration.

The upload process begins with the Client 200, which generates an HMAC (AH1) of the application image, encrypts and combines the hash with the application image, and sends separate, cryptographically protected messages to the Web/CGI 210 and Comparator 220. The Web/CGI 210 decrypts the message and generates its own HMAC (AH2) of the application image. The Web/CGI 210 sends separate, cryptographically protected messages containing the application image to the Security Engine 230 and Verifier 240 using keys shared by it and the two components respectively. The Comparator 220 decrypts the message and generates its own HMAC (AH5) of the application image and decrypts the Client's 200 HMAC (AH1).

The Security Engine 230 decrypts the message and generates its own HMAC (AH3) of the application image. The Security Engine 230 then reads the target device configuration data from non-volatile memory 300, generates an HMAC (DH5) from the data and validates it against the HMAC (DH2) stored with the data. If the HMACs are valid, the Security Engine encrypts the application image using information stored within the target device configuration data, generates an HMAC (IH1) of the resulting encrypted image and stores the encrypted image as well as its HMAC to non-volatile memory 300.

The Verifier 240, in a similar fashion as the Security Engine 230, decrypts its message, generates its own HMAC (AH4) of the application image, reads the target device configuration data from non-volatile memory 300, generates an HMAC (DH6) and validates it against the HMAC (DH2) stored with the data and encrypts the application image. The Verifier 240 also generates an HMAC (IH2) of the resulting encrypted image but does not actually store the encrypted image.

Figure 17:
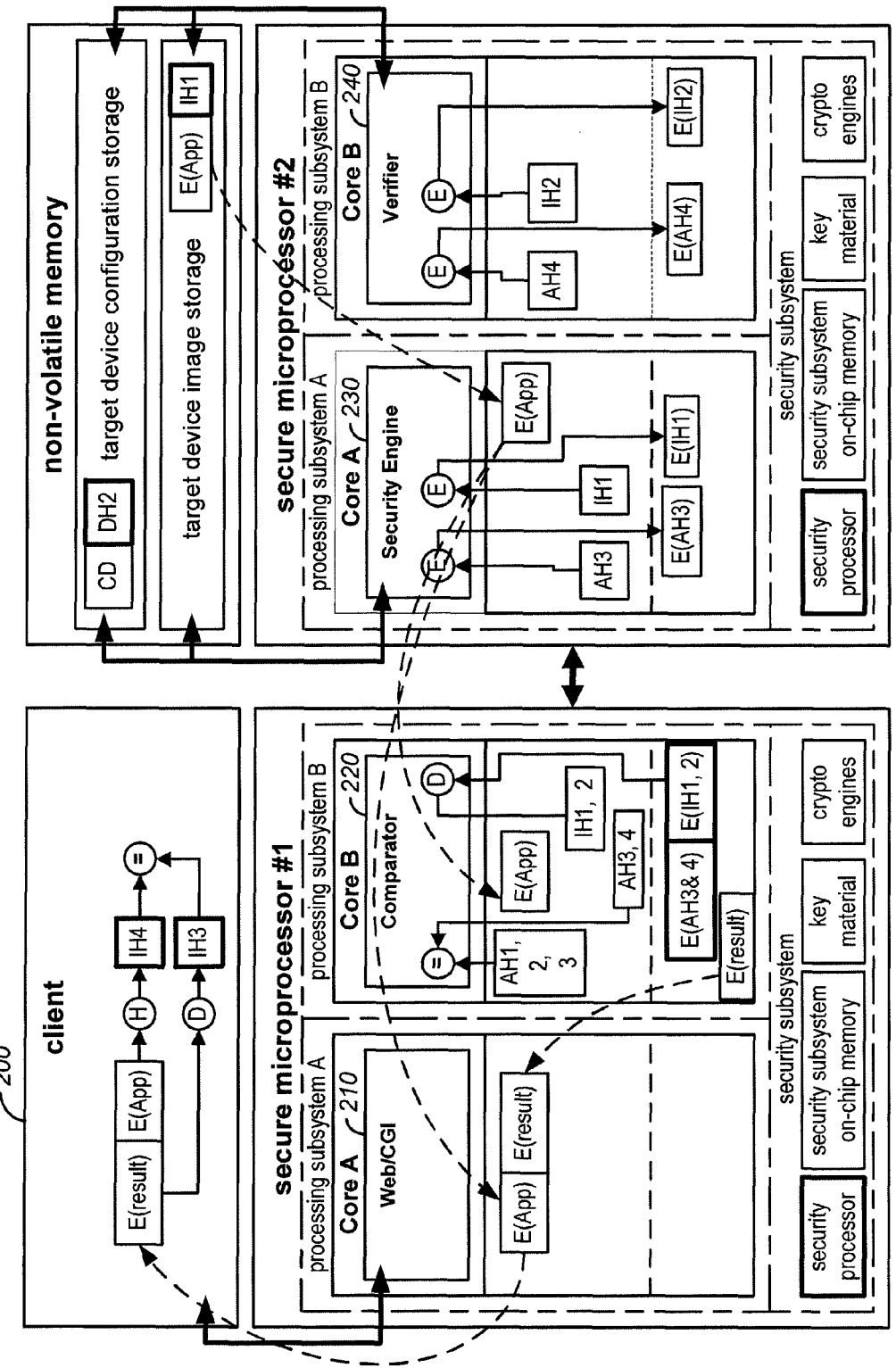
FIG. 17 illustrates downloading an application from the secure microprocessor.

FIG. 17 illustrates the security server's download operation in which an encrypted application image, after being stored during an upload operation, is retrieved from non-volatile memory 300 and sent to the Client 200. The Security Engine 230 encrypts its HMACs, AH3 and IH1, using a key it shares only with the Comparator 220 and places the ciphertext into shared on-chip memory. Similarly, the Verifier 240 encrypts its HMACs, AH4 and IH2, using a key it shares only with the Comparator 220 and places the ciphertext into shared on-chip memory. The Security Engine 230 also sends the encrypted image to the Web/CGI 210 and to the Comparator 220. The Comparator 220 retrieves the four ciphertext values, decrypts them to produce AH3, AH4, IH1 and IH2. To validate the integrity of the application image, the Comparator 220 compares AH3 and AH4 with its own application image HMAC (AH5) and the application image HMACs generated by the Client 200 and the Web/CGI 210, AH1 and AH2 respectively. To validate the integrity of the encrypted image, the Comparator 220 compares IH1 and IH2 with its own encrypted image HMAC (IH3). The end result of the various comparisons along with the Comparator's 220 HMAC (IH3) is encrypted and sent to the Web/CGI 210 for transmission to the Client 200. The Web/CGI 210 sends the encrypted image from the Comparator 220 to the Client 200. The Client 200 receives the encrypted image and result and verifies the result and encrypted image using its own encrypted image HMAC (IH4). Assuming the comparison is successful, the Client 200 is assured the application image written to the target device matches the application image provided by the Client 200 during the upload operation.

The preceding has been an explanation of the preferred embodiments of the security server of a preferred embodiment of our invention. While many details have been provided with regard to the particular structure of the server and its methods of operation, it will be appreciated that these are provided to enable more complete understanding of a preferred implementation. The scope of the invention is defined by the following claims.

What is claimed is:

1. A security server for programming a target device, the security server comprising a card including:
   a communications bus; first and second secure processors cross-coupled by the communications bus; and a memory;
   the first secure processor programmed with an interface and a comparator, wherein the interface receives encrypted configuration data from a client for the target device;
   the second secure processor programmed with a security engine and a verifier, wherein the security engine receives the encrypted configuration data from the interface of the first secure processor, stores configuration data in the memory and sends a cryptographic message to the comparator;
   wherein the verifier reads the configuration data from the memory, and sends a cryptographic message to the comparator for comparison with the cryptographic message sent by the security engine; and
   wherein communications between the first and second processors via the communications bus are encrypted.

2. A security server as in claim 1 wherein the interface includes a graphical user interface.

3. A security server as in claim 1 wherein:
   an image is received by the interface, which sends a first encrypted image to the security engine and a second encrypted image to the verifier;
   the security engine decrypts the image, re-encrypts the image using the stored target device configuration data, stores the re-encrypted image in the memory, and generates a cryptographic message based in the re-encrypted image; and
   the verifier reads data stored in the memory, and generates a cryptographic message for comparison against the cryptographic message generated by the security engine.

4. A security server as in claim 1 wherein different preloaded cryptographic keys are used for communications between the interface and the security engine, the interface and the verifier, the comparator and the security engine, and the comparator and the verifier.

5. A security server as in claim 1 wherein the memory includes separate socketable storage for the configuration data and for application data received by the first secure processor.

6. A security server for programming a target device, the security server comprising:
   a first secure processor programmed with a comparator, and an interface for receiving configuration data and an application image for the target device;
   memory; and
   a second secure processor programmed with a verifier, and a security engine for receiving the configuration data and the application image from the interface, combining the application image and the configuration data, and storing the combined configuration data and the application image in the memory prior to programming the target device;
   the verifier retrieving the stored application image;

the comparator comparing the retrieved application image and the received application image to verify the application image was correctly stored in the memory;

wherein the first and second secure processors cross-coupled by a communications bus, and communications between the first and second processors are encrypted.

7. A security server for programming a target device, the security server comprising:

a first secure processor programmed with a comparator and an interface;

a second secure processor programmed with a verifier and a security engine; and a communications bus for cross-coupling the first and second secure processors, wherein communications between the first and second processors via the communications bus are encrypted;

wherein the interface receives target data for the target device and sends the target data to the security engine and separately sends the target data to the verifier, the target data including at least one of configuration data and an application image;

wherein the security engine stores the target data and generates and stores a first hash of the target data and sends the first hash to the comparator;

wherein the verifier generates a second hash of the target data and sends the second hash to the comparator; and wherein the comparator compares the first and second hashes to verify the stored target data.

8. The security server of claim 7, wherein the target data includes an application image combined with configuration data.

* * * * *